United States Patent [19]

Matsumoto et al.

[11] 4,426,150

[45] Jan. 17, 1984

[54] COPYING MACHINE WITH AUTOMATIC DOCUMENT FEEDER

[75] Inventors: Hiroshi Matsumoto, Yokohama; Tomoki Ogura, Ayase, both of Japan

[73] Assignee: Tokyo Shibaura Denki Kabushiki Kaisha, Kawasaki, Japan

[21] Appl. No.: 317,424

[22] Filed: Nov. 2, 1981

[30] Foreign Application Priority Data

Nov. 5, 1980 [JP] Japan ................. 55-155471

[51] Int. Cl.$^3$ ............................................ G03G 15/00
[52] U.S. Cl. .................... 355/14 SH; 355/3 SH; 355/14 R
[58] Field of Search ............... 355/14 R, 14 SH, 3 R, 355/3 SH, 50, 8; 271/3.1, 4, 9, 64, 258, 291

[56] References Cited

U.S. PATENT DOCUMENTS

| 4,006,648 | 2/1977 | de Keyzer | 355/8 X |
| 4,076,408 | 2/1978 | Reid et al. | 355/14 SH |
| 4,078,787 | 3/1978 | Burlew et al. | 355/14 SH X |
| 4,084,900 | 4/1978 | Yamaoka et al. | 355/14 SH |
| 4,113,374 | 9/1978 | Nakamura et al. | 355/14 R |
| 4,170,414 | 10/1979 | Hubert et al. | 355/14 SH |
| 4,192,607 | 3/1980 | Hage | 355/14 SH |
| 4,315,685 | 2/1982 | Inuzuka et al. | 355/8 |

Primary Examiner—A. C. Prescott
Attorney, Agent, or Firm—Cushman, Darby & Cushman

[57] ABSTRACT

A copying machine main body has a document table on which a document is set, a sheet storing means for storing copy sheets, sheet amount detecting means for detecting if an amount of the copy sheets in the document storing means has reached a predetermined value, feeding means for individually feeding the copy sheets from said copy sheet storing means, and image forming means for forming, on the copy sheet supplied by said copy sheet feeding means, and an image of the document set on the document table. The copying machine main body further includes an automatic document feeder. The automatic document feeder has conveying means for conveying the inserted document to the document table, discharging means for discharging the document from the document table after image formation, document feed inhibiting means for inhibiting supply to the document table of a document following the document after image formation and a detector which detects insertion of the document to generate a copying start signal to the copying machine main body. When there is no more copy sheet in the sheet storing means, a detecting signal from the sheet amount detecting means is transmitted to the microprocessor. The microprocessor supplies a driving signal to the discharging means to discharge the document.

3 Claims, 48 Drawing Figures

F I G. 2A
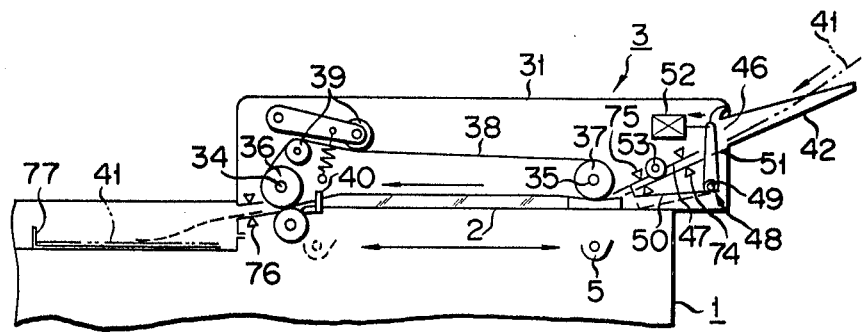
F I G. 2B
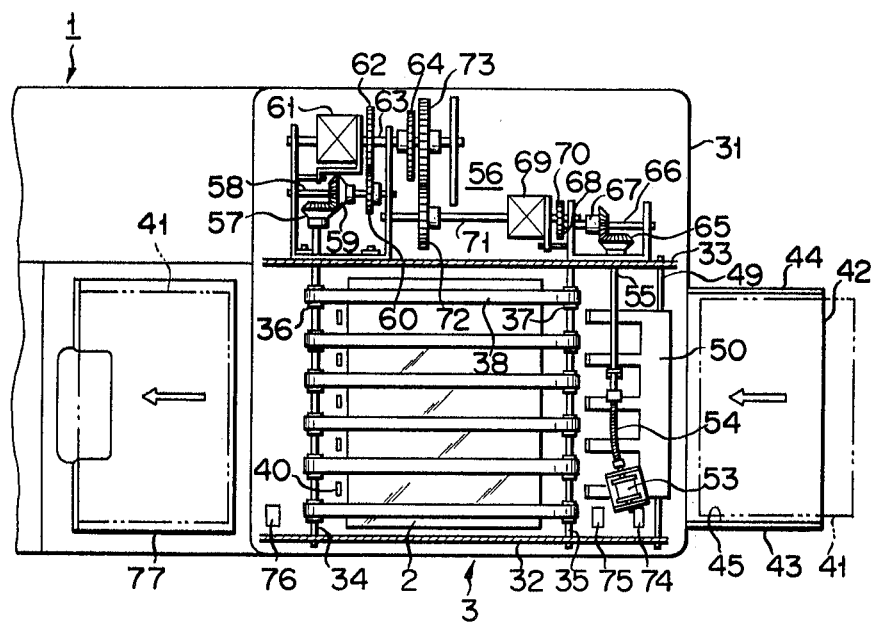

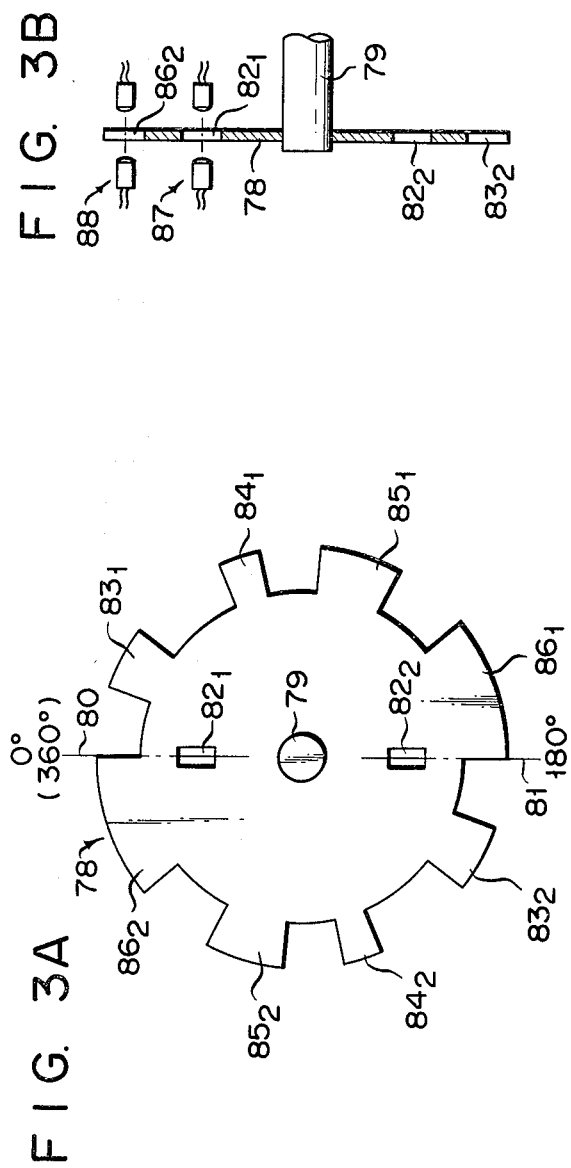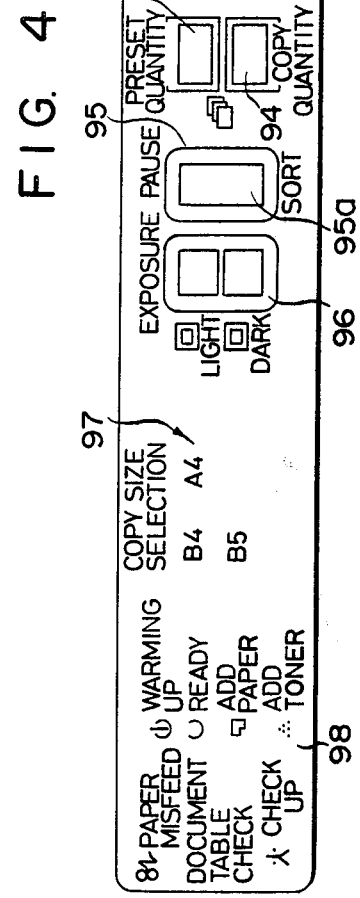

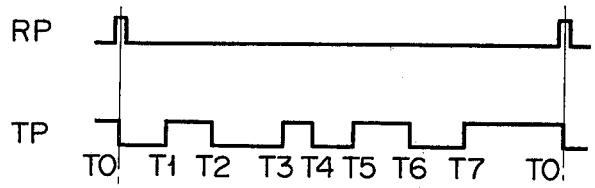

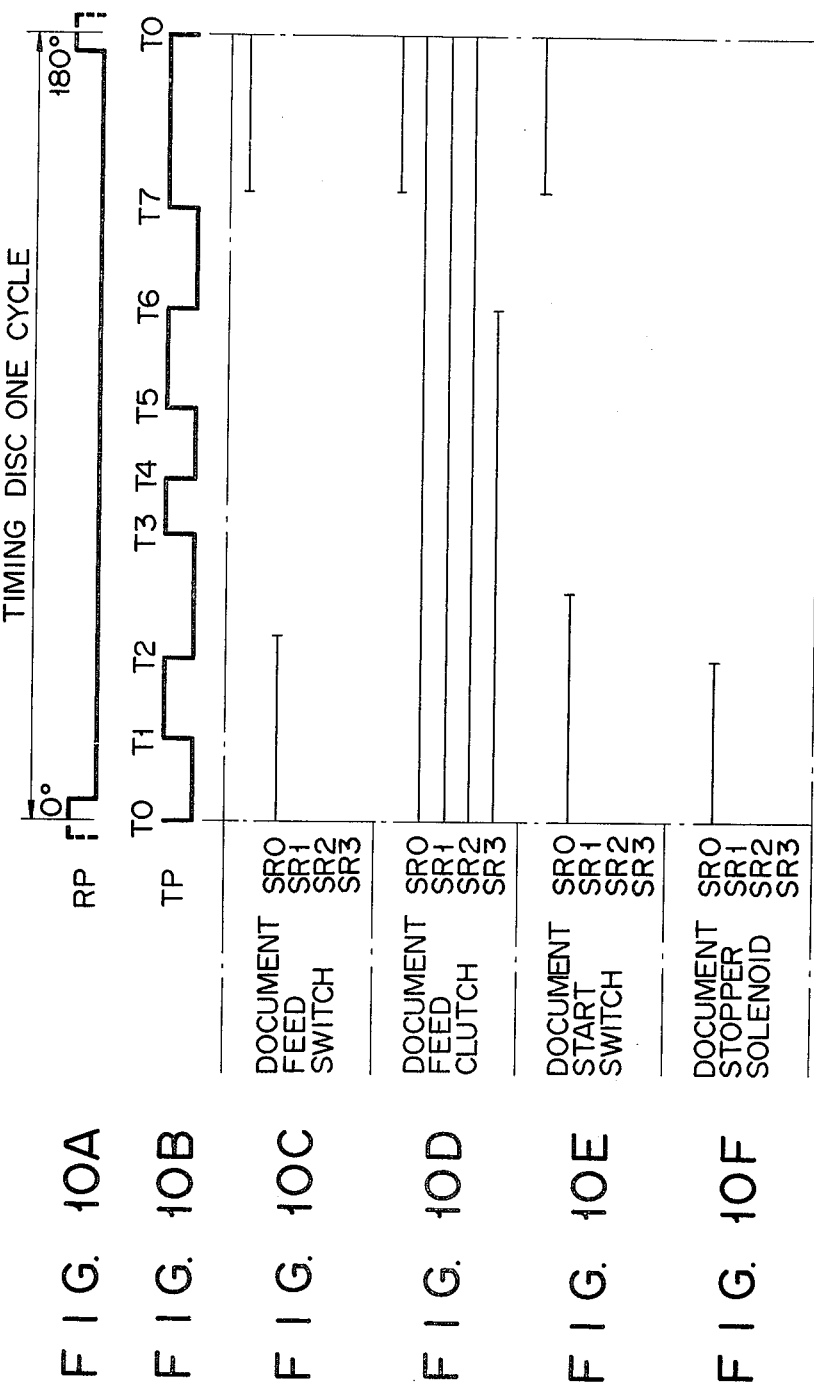

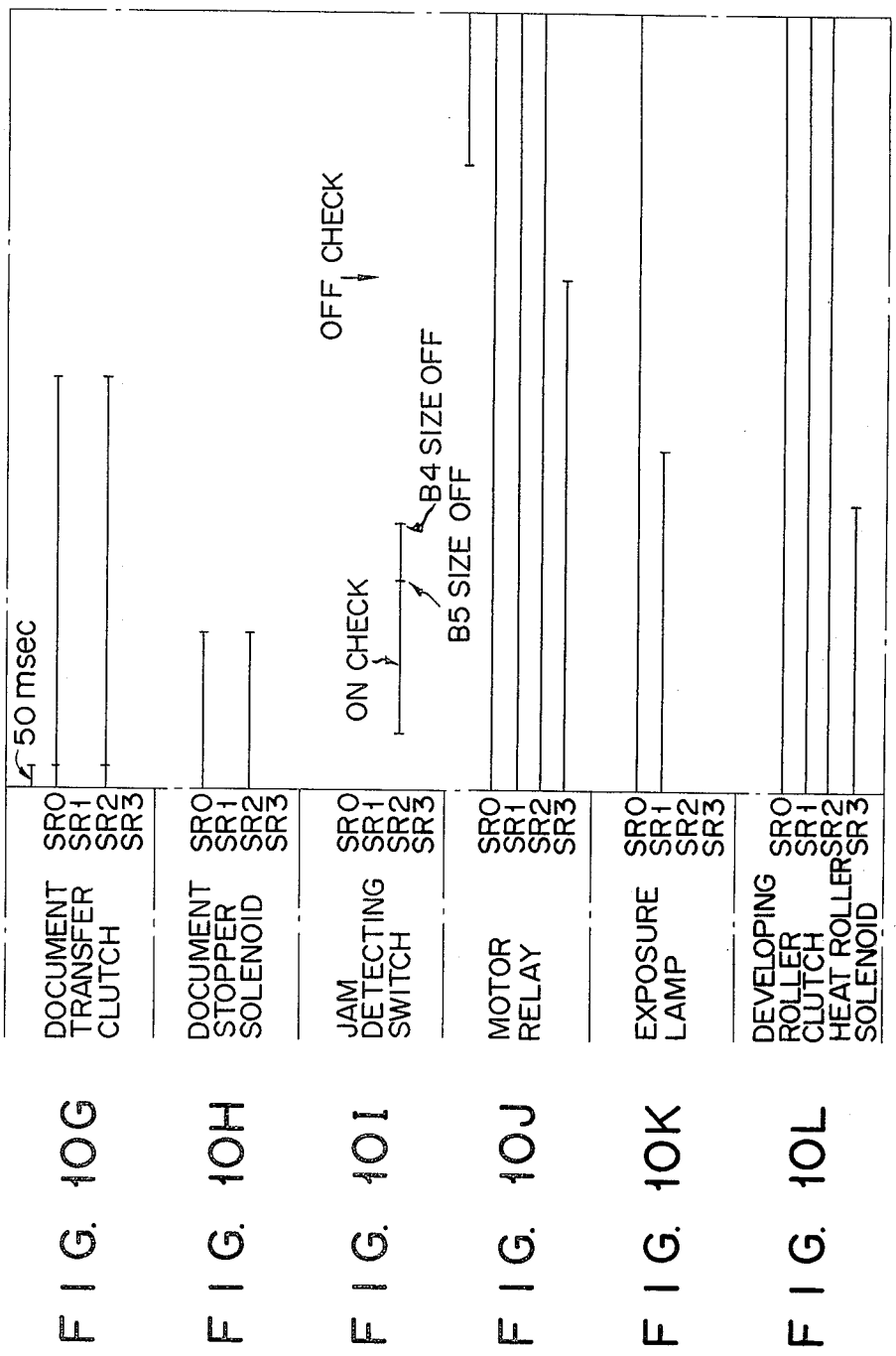

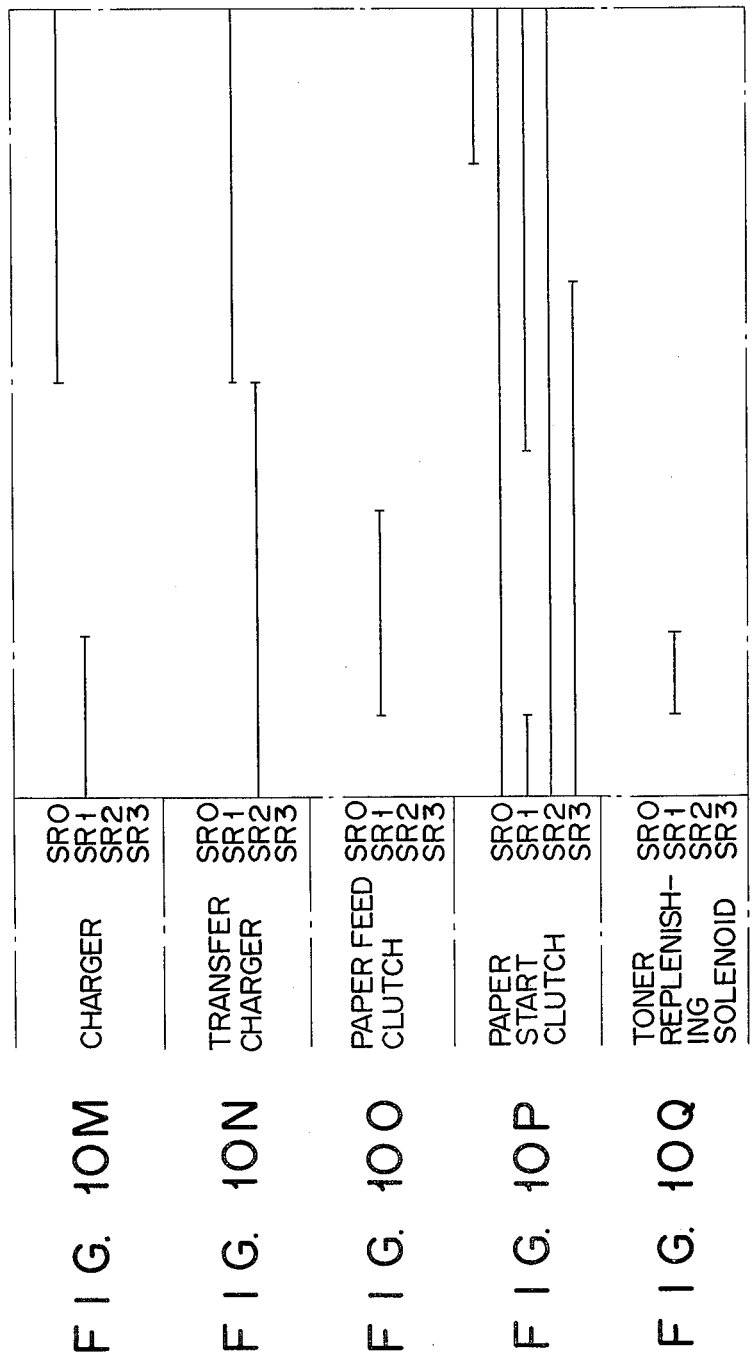

COPYING MACHINE WITH AUTOMATIC DOCUMENT FEEDER

BACKGROUND OF THE INVENTION

The present invention relates to a copying machine with an automatic document feeder.

With a conventional copying machine of this type, when there are no more copy sheets in the automatic document feeder and more copy sheets must be supplied, the document which is being copied remains within the automatic document feeder. Therefore, for resuming the copying operation after more copy sheets are supplied, the document must be replaced, resulting in an inconvenience. Furthermore, the automatic document feeder operates in response to insertion of the document and this insertion of the document also serves as the depression of the copying key. Therefore, for continuous copying of the previous document, the copying key must be depressed again. Alternatively, the document must be taken out of the machine and must then be reinserted, so that the conventional copying machines with an automatic document feeder of this type have been inferior in operability.

SUMMARY OF THE INVENTION

It is an object of the present invention to provide a copying machine with an automatic document feeder which eliminates the drawbacks of the conventional copying machines of this type, and which is capable of automatically discharging the document within the automatic document feeder when more copy sheets must be supplied during the operative period of the automatic document feeder, so that supply of the next document to the automatic document feeder may be prevented.

In order to achieve the above and other objects, there is provided according to the present invention a copying machine with an automatic document feeder, comprising:

(A) a copying machine main body having
  a. a document table on which is set a document,
  b. copy sheet storing means for storing copy sheets,
  c. sheet amount detecting means for detecting if an amount of the copy sheets in said document storing means has reached a predetermined value,
  d. feeding means for individually feeding the copy sheets from said copy sheet storing means, and
  e. image forming means for forming, on the copy sheet supplied by said copy sheet feeding means, an image of the document set on said document table;

(B) an automatic document feeder having
  a. conveying means for conveying the inserted document to said document table,
  b. discharging means for discharging the document from said document table after image formation,
  c. document feed inhibiting means for inhibiting supply to said document table of a document following the document after image formation, and
  d. a detector which detects insertion of the document to generate a copying start signal to said copying machine main body; and (C) controlling means for controlling said discharging means in response to a detection signal from said sheet amount detecting means.

According to the present invention, a means is provided to forcibly discharge the document within the automatic document feeder, when more copy sheets must be supplied during the operative period of the automatic document feeder. Therefore, when another document must be copied after more copy sheets are supplied, the document need not be replaced. For continuously copying the preceding document, the forcibly discharged document need only be reinserted. The construction of the copying machine with an automatic document feeder of the present invention is such that, when the document remaining in the automatic document feeder is automatically forcibly discharged, the next document may not be drawn into the automatic document feeder, resulting in excellent operability.

BRIEF DESCRIPTION OF THE DRAWINGS

Other objects and features of the present invention will be apparent from the following description taken in connection with the accompanying drawings in which:

FIGS. 2A and 2B show the details of the automatic document feeder shown in FIG. 1, wherein FIG. 2A is a side view and FIG. 2B is a plan view;

FIGS. 3A and 3B show a timing disk for obtaining a timing signal required for the copying operation of the copying machine with an automatic document feeder of the present invention, wherein FIG. 3A is a plan view and FIG. 3B is a side sectional view;

FIG. 4 is a plan view of a control panel of the copying machine shown in FIG. 1;

FIG. 6A to 6F show the relationship between the timing signal obtained from the timing disk and the corresponding processing cycle in the copying machine with an automatic document feeder shown in FIG. 1, wherein FIG. 6A corresponds to a reset pulse, FIG. 6B corresponds to a timing pulse, and FIGS. 6C to 6F show the cycle of every half rotation of the timing disk;

FIG. 7 shows the correspondence between the processing cycles and shift registers for single copying with the copying machine shown in FIG. 1;

FIG. 8 shows the correspondence between the processing cycles and shift registers for twice copying;

FIGS. 9A to 9I are flow charts showing the sequence control of the copying machine when the processing for the respective cycles shown in FIGS. 6C through 6F is performed serially, for the sake of ease in understanding the operation for continuous copying with the copying operation with an automatic document feeder according to the present invention;

FIGS. 10A to 10Q are charts of the timing signals used for the copying machine with an automatic document feeder according to the present invention, wherein FIG. 10A shows a timing signal for a reset pulse (RP), FIG. 10B shows a timing pulse (TP), FIG. 10C shows a timing signal for a document feed switch, FIG. 10D shows a timing signal for a document feed clutch, FIG. 10E shows a timing signal for a document start switch, FIG. 10F shows a timing signal for a document stopper solenoid, FIG. 10G shows a timing signal for a document transfer clutch, FIG. 10H shows a timing signal for a document stopper solenoid, FIG. 10I shows a timing signal for a jam detecting switch, FIG. 10J shows a timing signal for a motor relay, FIG. 10K shows a timing signal for an exposure lamp, FIG. 10L shows a timing signal for a developing roller clutch and a heat roller solenoid, FIG. 10M shows a timing signal for a charger, FIG. 10N shows a timing signal for a transfer charger, FIG. 10O shows a timing signal for a paper feed clutch, FIG. 10P shows a timing signal for a paper start clutch, and FIG. 10Q shows a timing signal for a toner replenishing solenoid.

DETAILED DESCRIPTION OF THE PREFERRED EMBODIMENTS

Figure 1:
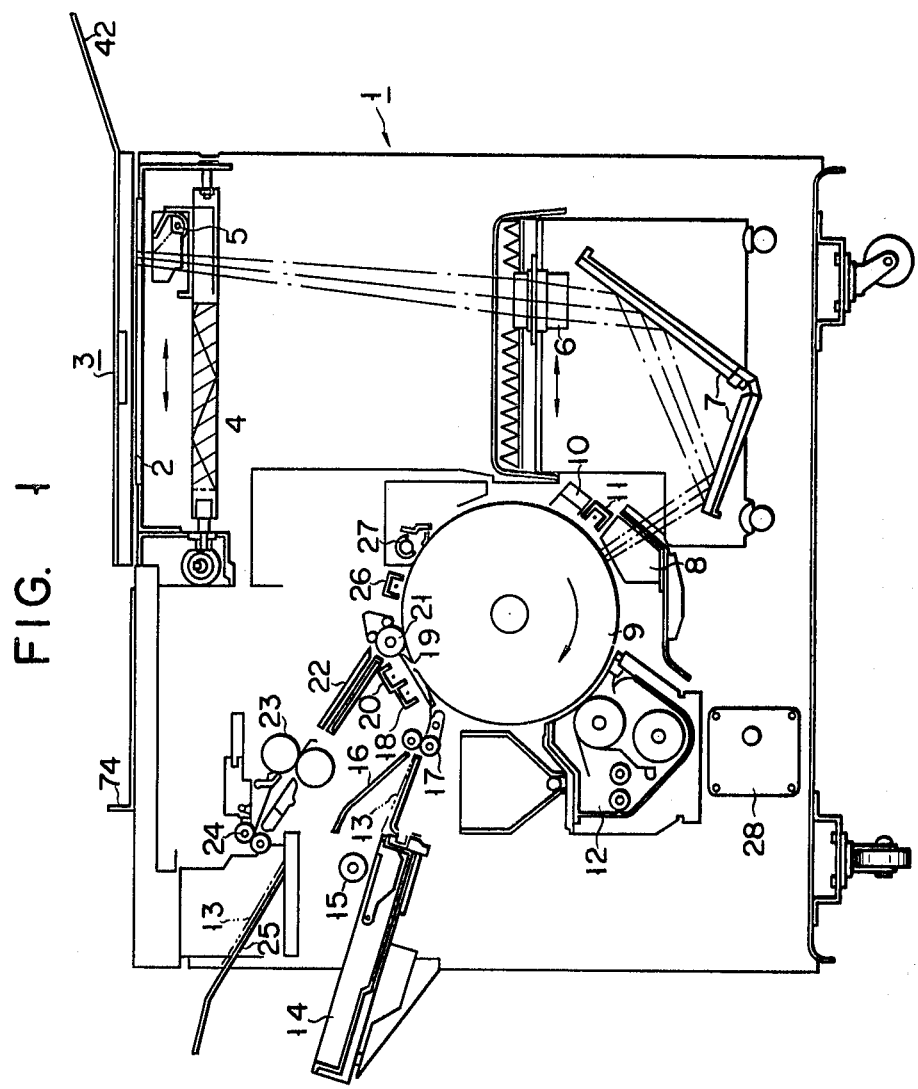
FIG. 1 is a side view schematically showing the overalll construction of a copying machine with an automatic document feeder according to the present invention.

FIG. 1 schematically shows a copying machine with an automatic document feeder according to the present invention. A document table (transparent glass) 2 is arranged at the upper right side of a copying machine main body 1. An automatic document feeder 3 covering the upper surface of the document table 2 is arranged so as to freely open and close. The copying machine main body 1 has the construction described below. A document placed on the document table 2 is exposed to light emitted from an exposure lamp 5 which is reciprocally movable by a cam shaft 4 in the direction indicated by the arrow in the figure. The light reflected by the document is transmitted through a lens 6 which reciprocates with the exposure lamp 5 in the direction indicated by the arrow. The light then becomes incident on a photosensitive drum 9 through a mirror 7 and an exposure slit 8 to form (slit exposure) an image of the document on the surface of the photosensitive drum 9. The photosensitive drum 9 rotates in the direction shown by the arrow. Charge on the surface of the photosensitive drum 9 is first removed by a charge removal lamp 10 and the surface is then charged by a charger 11. Then, the image of the document is slit-exposed to form an electrostatic latent image. This electrostatic latent image is visualized when toner is deposited by a developing unit 12.

A copy sheet 13 is taken out from a feed cassette 14 by a feed roller 15. Aligning rollers 17 send the sheet to a transfer section through a guide 16. The copy sheet 13 sent to the transfer section is brought into contact with the photosensitive drum 9 at the part opposite a transfer charger 18. A toner image of the photosensitive drum 9 is transferred to the copy sheet by the transfer charger 18. The copy sheet 13 is separated after image transfer from the surface of the photosensitive drum 9 by a separation tape 19 and a separation charger 20. The copy sheet 13 is then turned by a turn roller 21, and is guided through guides 22 to heat rollers 23 as a fixer. The transferred image is thus fixed. The copy sheet 13 is discharged after fixing to a discharge tray 25 through discharge rollers 24. Meanwhile, the photosensitive drum 9 is removed of charge after the image transfer, by reverse charging with a charge removal charger 26. Then, the portion of the toner remaining on the surface of the photosensitive drum 9 is removed by a cleaner 27 and is restored to the initial condition.

The copying machine main body 1 of the construction described above is driven by a single motor 28 which is arranged inside the main body 1. The motor 28 drives, through a drive force transmission mechanism (not shown), the cam shaft 4, the lens 6, the photosensitive drum 9, the developing rollers of the developing unit 12, the feed roller 15, the aligning rollers 17, the turn roller 21, the heat roller section of the heat rollers 23, and the discharge rollers 24. The motor 28 further drives a drive mechanism for the automatic document feeder 3 as will be described hereinafter.

The automatic document feeder 3 is constructed as shown in FIGS. 2A and 2B. The bottom (a surface opposing the document table 2) of a housing 31 opens. A front frame 32 and a rear frame 33 are arranged parallel to each other in the housing 31. A drive shaft 34 and a driven shaft 35 are extended parallel to each other between these frames 32 and 33. On the drive shaft 34 and the driven shaft 35 are mounted at intervals a plurality of rollers 36 and 37. Convey belts 38 are mounted between the rollers 36 and 37 so as to be capable of travelling on the document table 2 in the direction (from right to left) as shown in the figure. Therefore, the convey belts 38 slidably travel on the document table 2 as the drive shaft 34 rotates to convey the document inserted between the document table 2 and itself by a means to be described later and to supply or discharge the document to and from the document table 2. Tension mechanisms 39 provide tension to the convey belts 38. Document stoppers 40 stop the document conveyed onto the document table 2 at a predetermined position. These document stoppers 40 are free to extend up and down at the discharging side of the document table 2 and are driven by a solenoid 122 (FIG. 5).

A paper guide 42 for guiding the document 41 inserted projects at the right side of the housing 31. This paper guide 42 has a front side frame 43 and a rear side frame 44. The inner surface of the front side frame 43 defines a reference surface 45 for positioning the document 41. The document 41 which is inserted as guided by the paper guide 42 is further guided to a guide channel 47 in the housing 31 through an opening 46 formed in the right side surface of the housing 31. The document 41 is then guided to the space between the convey belts 38 and the document table 2. A document stopper mechanism 48 is arranged at the outlet side of the guide channel 47 for temporarily stopping the inserted document 41. The document stopper mechanism 48 comprises a stop lever 50 one end of which is pivotable about a shaft 49 and the front end of which is free to extend to the outlet side of the guide channel 47, a drive arm 51 which is fixed to the support part of the stopper lever 50, and a solenoid 52 for driving the stop lever 50 through the drive arm 51. An inclined roller 53 for aligning the leading edges of the copy sheets is arranged at the middle part of the guide channel 47 and in the vicinity of the front frame 32 and the stopper mechanism 48. This inclined roller 53 is rotatably held by a holding member (not shown) such that rotational shaft is inclined through a predetermined angle from the lower right side to the left upper side (FIG. 2B). When the document 41 which is guided by the paper guide 42 to the guide channel 47 is brought into contact with the upper surface of the inclined roller 53, it guides the document 41 toward the direction of the stop lever 50 and the reference surface 45 of the paper guide 42. The inclined roller 53 aligns the leading edge of the document 41 to the front end of the stop lever 50 while keeping it to slide along the reference surface 45 and the stop lever 50. The rotational shaft of the inclined roller 53 is fixed to the front end of a drive shaft 55 through a joint spring 54, so that the inclined roller 53 may rotate as the drive shaft 55 rotates. The drive shaft 55 is arranged between the rear frame 33 and a support frame (not shown).

In this manner, the drive shaft 34 and the drive shaft 55 are driven by a drive mechanism 56 arranged outside the rear frame 33. The drive mechanism 56 is constructed in the manner to be described below. A driven bevel gear 57 is mounted at the top end of the drive shaft 34. This driven bevel gear 57 engages with a drive bevel gear 59 which is mounted on a rotary shaft 58. A driven gear 60 is mounted on the rotary shaft 58. This gear 60 engages with a drive gear 62 fixed to the output side of an electromagetic clutch 61. The electromagnetic clutch 61 is for conveying the document and will be referred to as a document convey clutch hereinafter. A rotary shaft 63 is fixed to the input side of the document convey clutch 61, and a sprocket 64 is mounted on the rotary shaft 63. The sprocket 64 is connected to the motor 28 arranged at the side of the copying machine main body 1 through a drive force transmission mechanism such as a chane (not shown), so that the driving force of the motor 28 may be transmitted thereto.

A driven bevel gear 65 is mounted on one end of the drive shaft 55, and this driven bevel gear 65 engages with a drive bevel gear 67 mounted on a rotary shaft 66. A driven gear 68 is mounted on the rotary shaft 66. The gear 68 engages with a drive gear 70 which is fixed to the output side of an electromagnetic clutch 69. The electromagnetic clutch 69 is a clutch for feeding the document, and will be referred to as a document feed clutch hereinafter. A rotary shaft 71 is fixed to the input side of the document feed clutch 69. A driven gear 72 is mounted on the rotary shaft 71. The gear 72 engages with a drive gear 73 which is mounted on the rotary shaft 63, so that the rotational force of the motor 28 may be transmitted.

A detector 74 for optically detecting the inserted document 41 is arranged in the vicinity of the inlet side of the guide channel 47. This detector 74 will be referred to as a document feed switch hereinafter. Another detector 75 for optically detecting the guided document 41 is disposed at the front end side of the stop lever 50 at the outlet side of the guide channel 47. This detector 75 will be referred to as a document start switch hereinafter. A jam detector 76 for optically detecting a jam of the document 41 during the discharging from the document table 2 is arranged in front of the convey side of the convey belts 38, this detector 76 will be referred to as a jam detecting switch hereinafter.

The automatic document feeder 3 of the construction as described above is mounted to the copying machine main body 1 through a hinge mechanism (not shown) which pivots about the rotary shaft 63, so that it is free to open and close relative to the document table 2. A document stocker 77 for receiving the document 41 from the document table 2 is disposed at the discharging side of the document table 2 and on the copying machine main body 1.

FIGS. 3A and 3B show a timing disk 78 for obtaining the timing signals required for copying operation of the copying machine with an automatic document feeded according to the present invention. The timing disk 78 is coupled to the rotary shaft of the photosensitive drum 9 shown in FIG. 1 through the rotary shaft 79. When the radially opposing positions of the timing disk 78, that is, the position of a line 80 is 0 degree (or 360 degrees) and the position of a line 81 is 180 degrees, signal holes $82_1$ and $82_2$ are formed at these positions. These signal holes $82_1$ and $82_2$ are for obtaining the reset pulse representing the position of the timing disk 78 (corresponding to the position of the photosensitive drum 9). Around the outer periphery of the timing disk 78 through a predetermined angle from the reference positions of 0 degree and 180 degrees are sequentially radially arranged signal plates $83_1$, $84_1$, $85_1$, $86_1$, $83_2$, $84_2$, $85_2$ and $86_2$. As may be seen from FIG. 3A, the signal plates $83_1$, $84_1$, $85_1$ and $86_1$ and the signal plates $83_2$, $84_2$, $85_2$ and $86_2$ are arranged at the outer periphery of the timing disk 78 in a symmetrical manner. These signal plates $83_1$ to $86_1$ ($83_2$ to $86_2$) are for obtaining the timing signals for actual control of the various operations. A detector 87 for optically detecting the signal holes $82_1$ and $82_2$ and another detector 88 for optically detecting the signal plates $83_1$ to $86_1$ and $83_2$ to $86_2$ are arranged in the vicinity of the periphery of the timing disk 78.

FIG. 4 shows the control panel of the copying machine described above. Referring to FIG. 4, reference numeral 89 denotes a panel main body; 90, a copying key; 91, numeric keys for setting the copying sheet number; 92, a clear/stop key; 93, a preset sheet number display for digitally displaying the set copying sheet number; 94, a copying sheet number display for displaying the number of copy sheets already copied; 95, an interrupt key for making an interruption; 95a, an interruption display lamp arranged at the head of the interruption key 95; 96, a density setting key for setting the density of the document; 97, a copy size display for displaying the selected copy size; and 98, a status display.

Figure 5A:
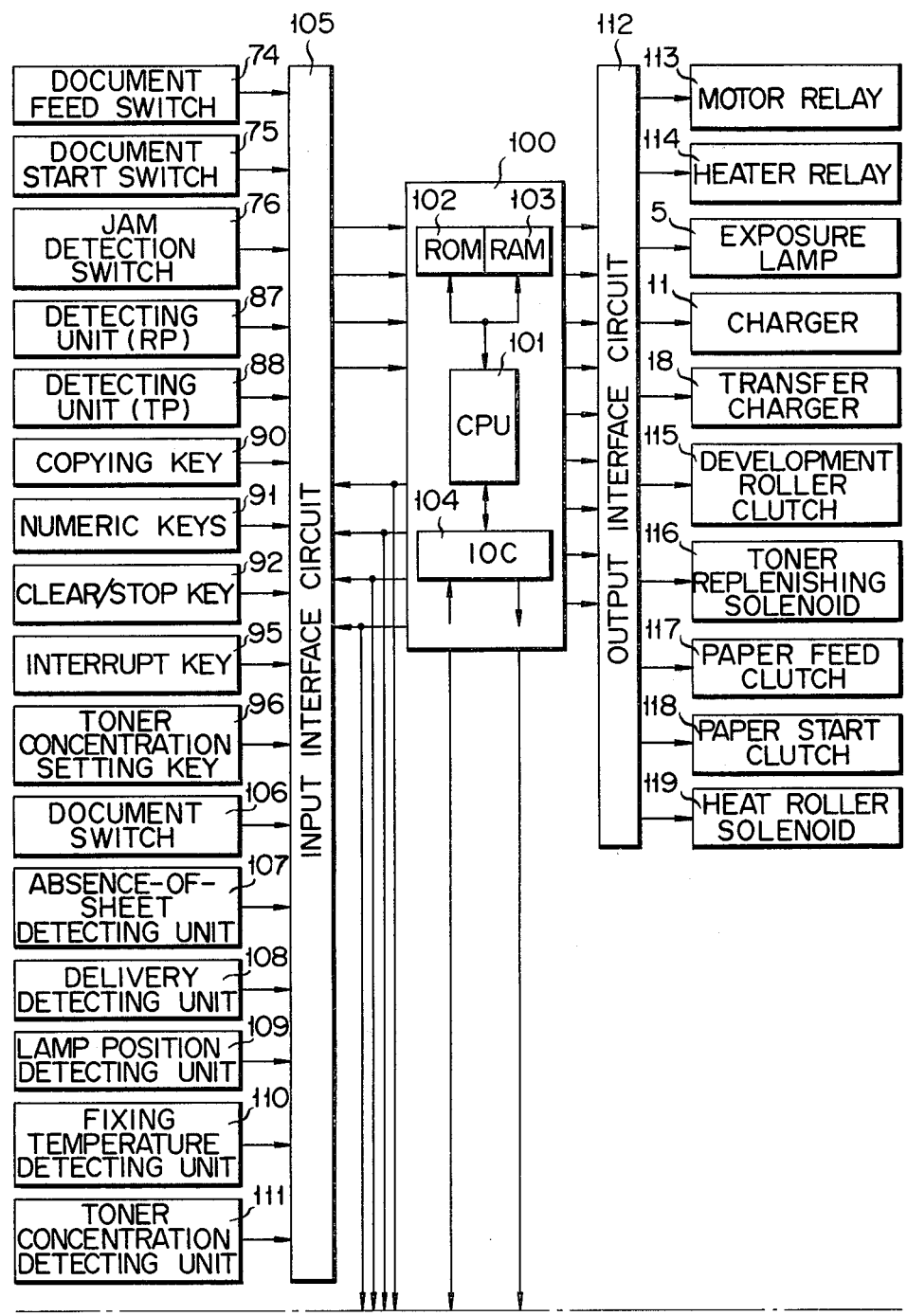
FIGS. 5A and 5B are schematic block diagrams showing the control system of the copying machine shown in FIG. 1.
Figure 5B:
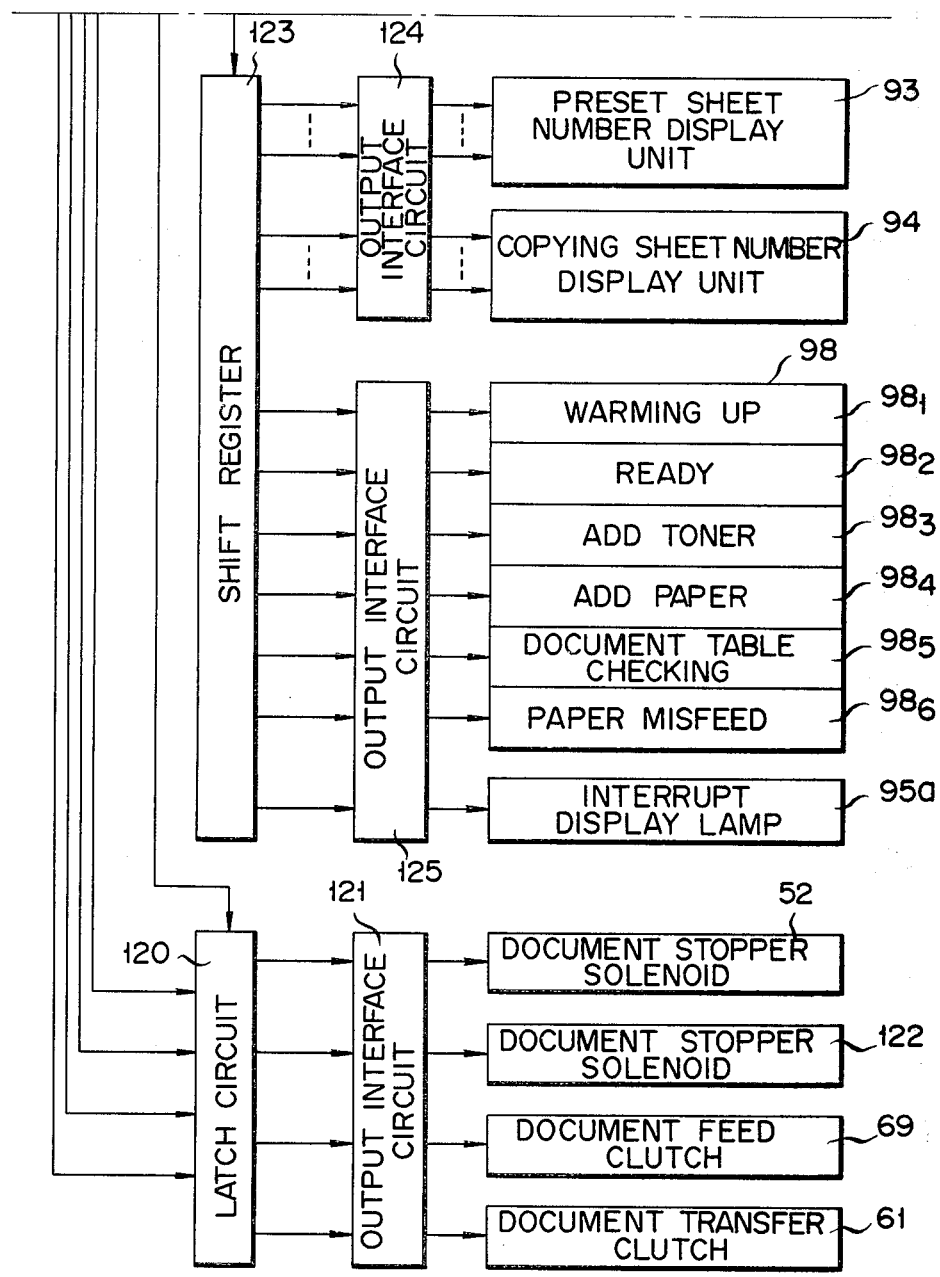
Figure 9A:
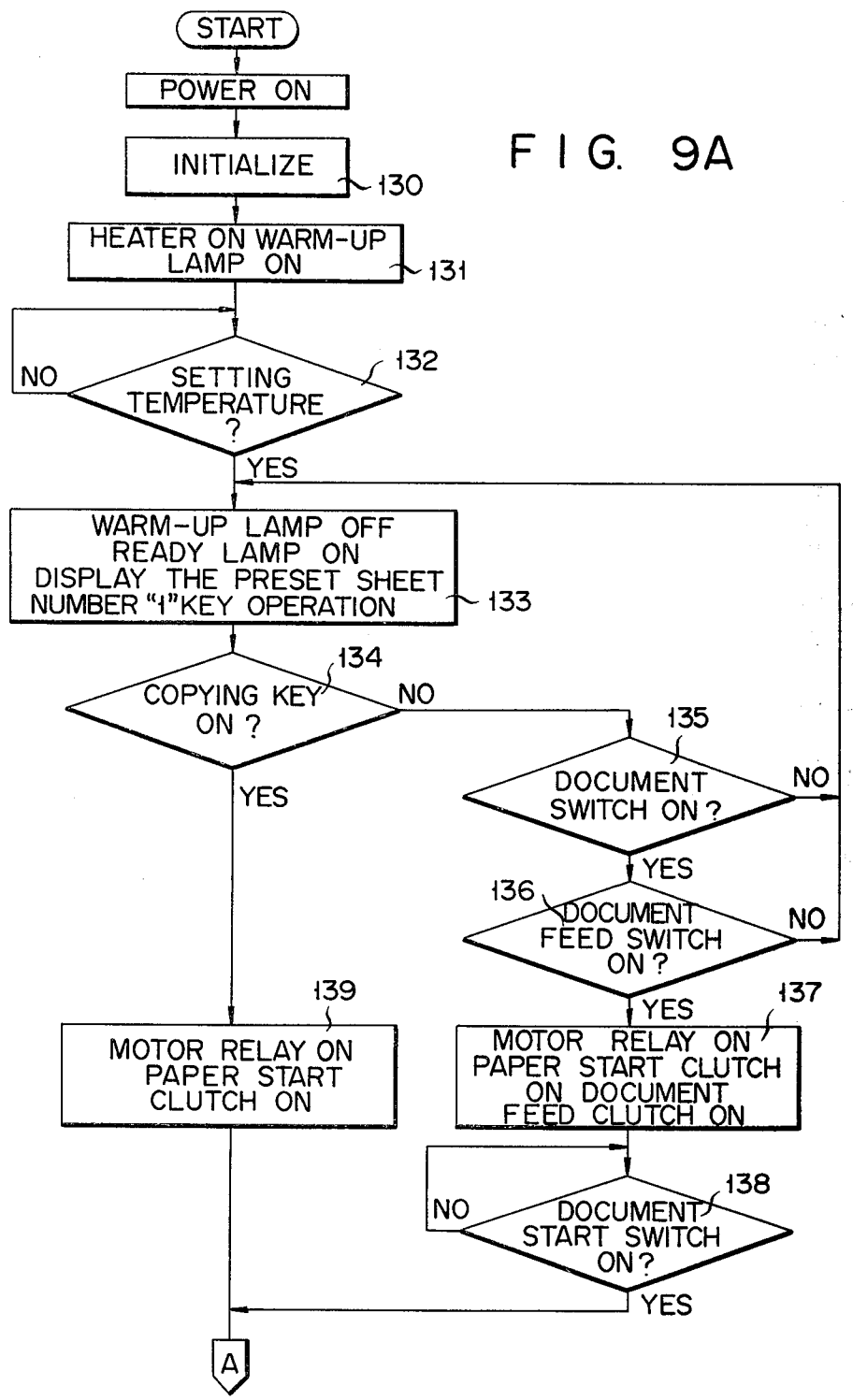
Figure 9B:
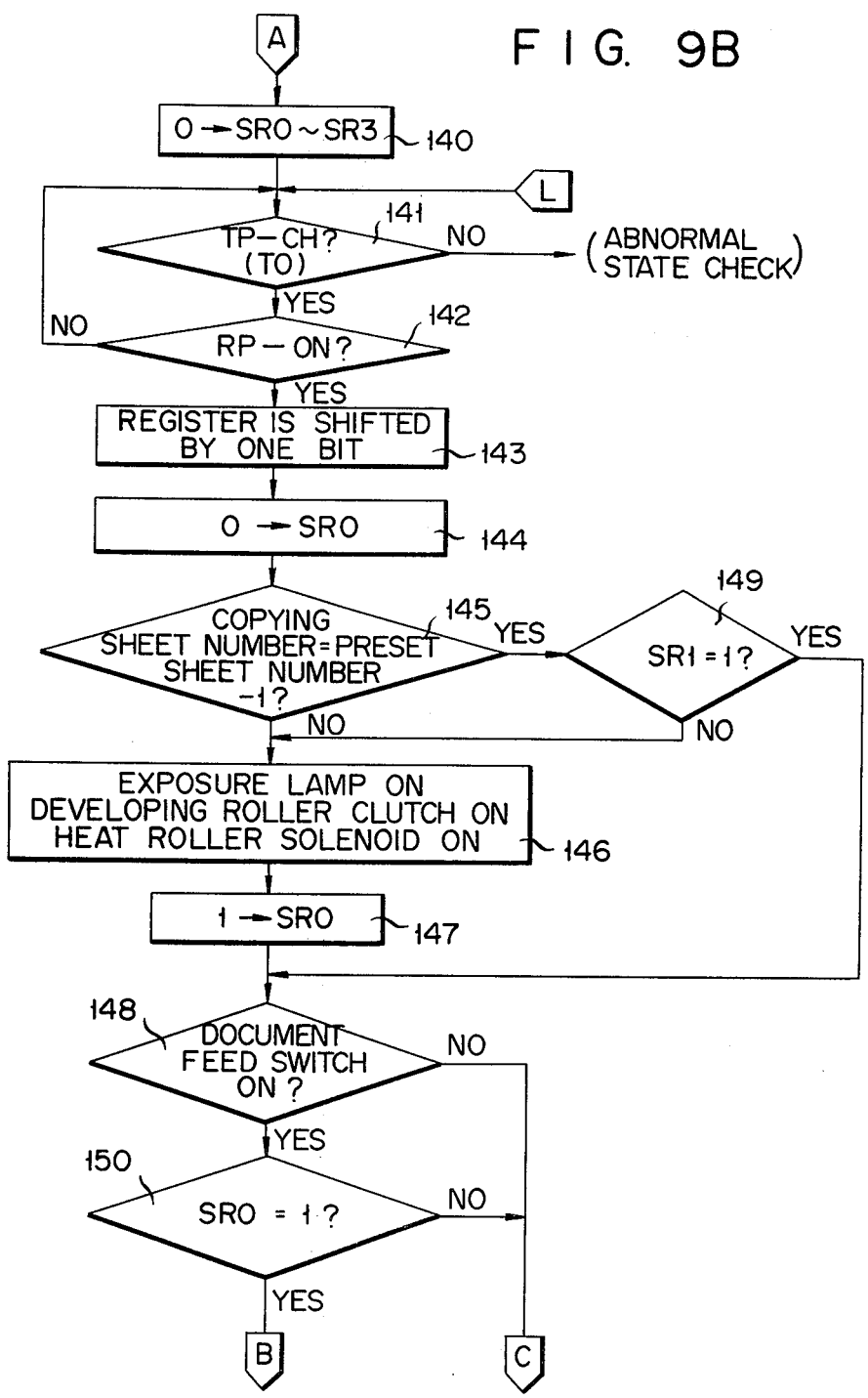
Figure 9C:
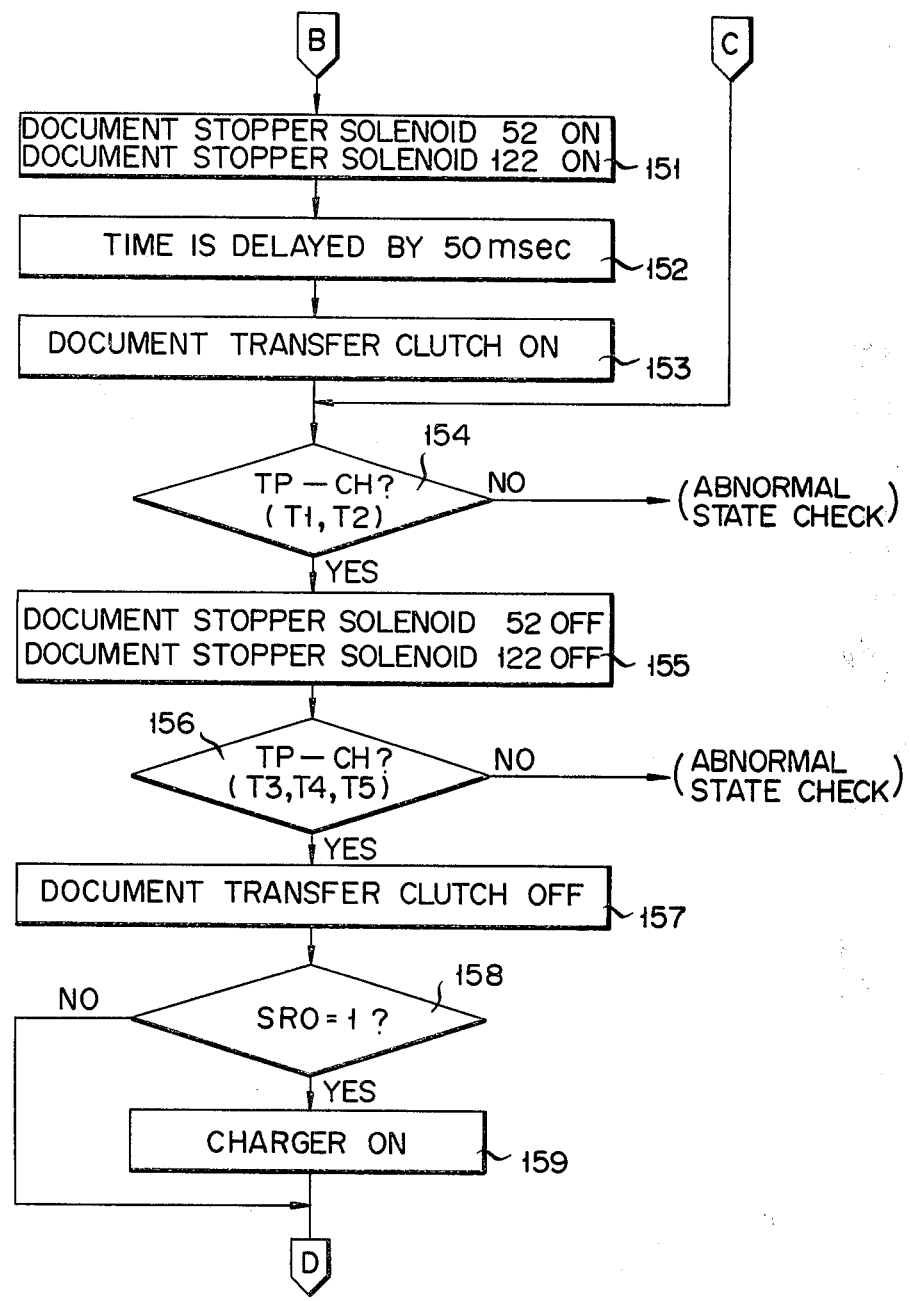
Figure 9D:
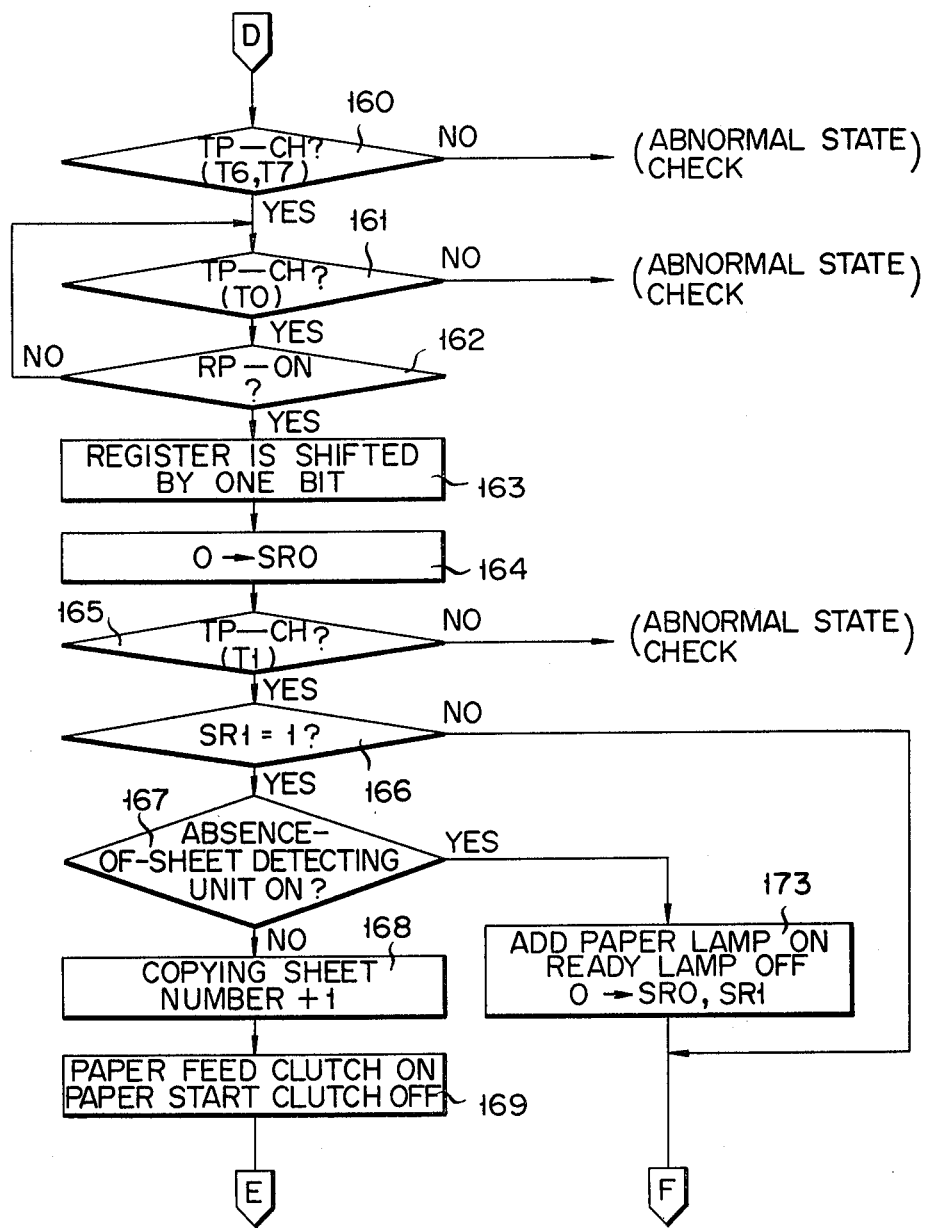
Figure 9E:
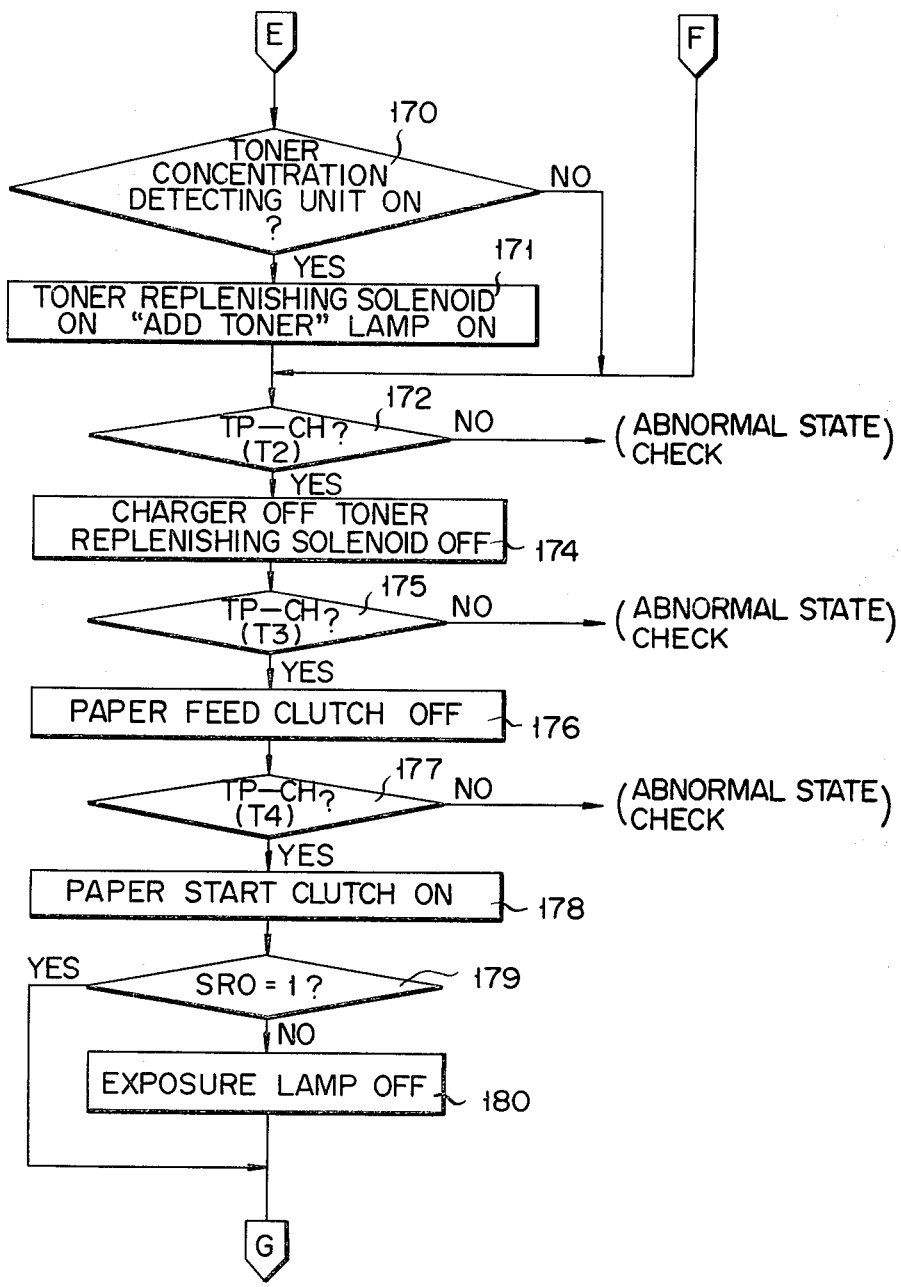
Figure 9F:
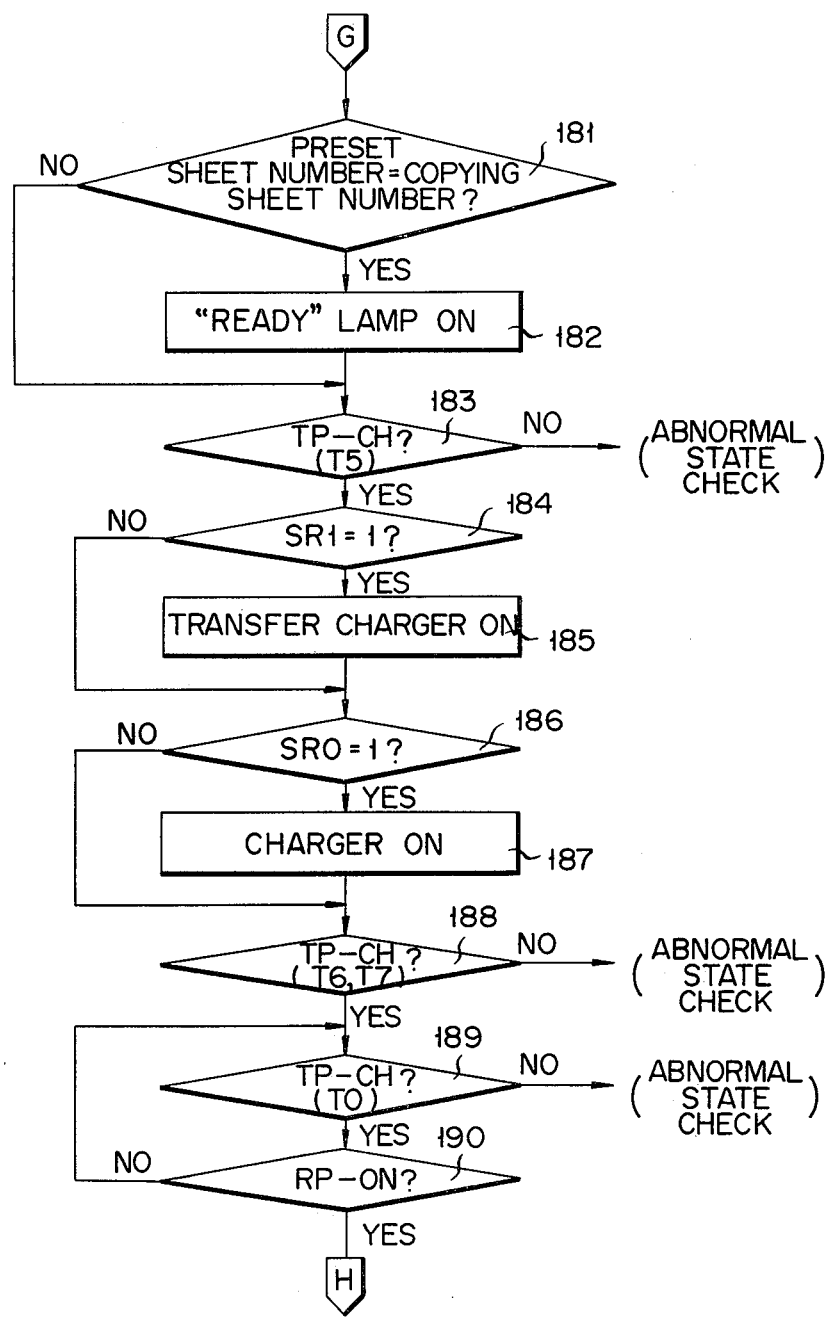
Figure 9G:
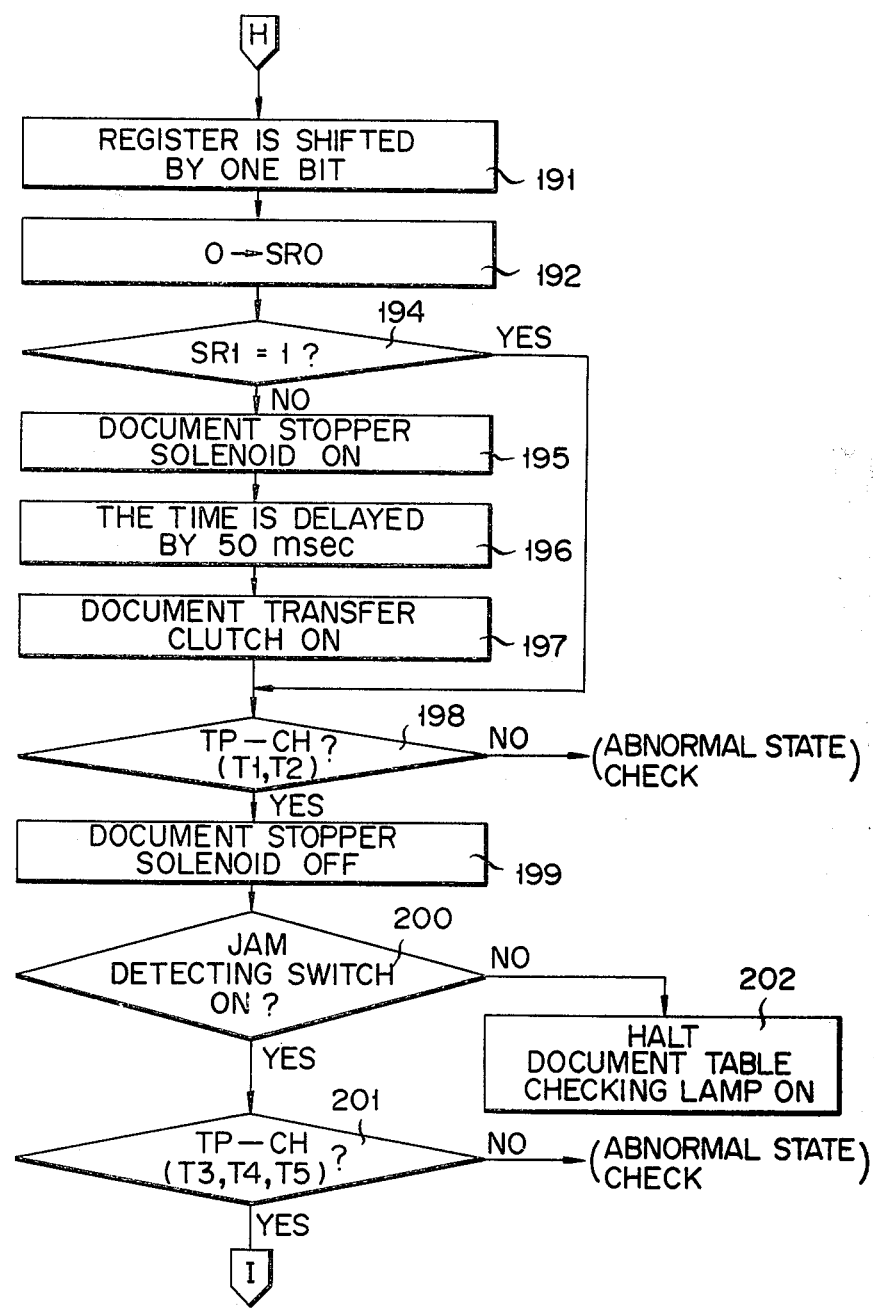
Figure 9H:
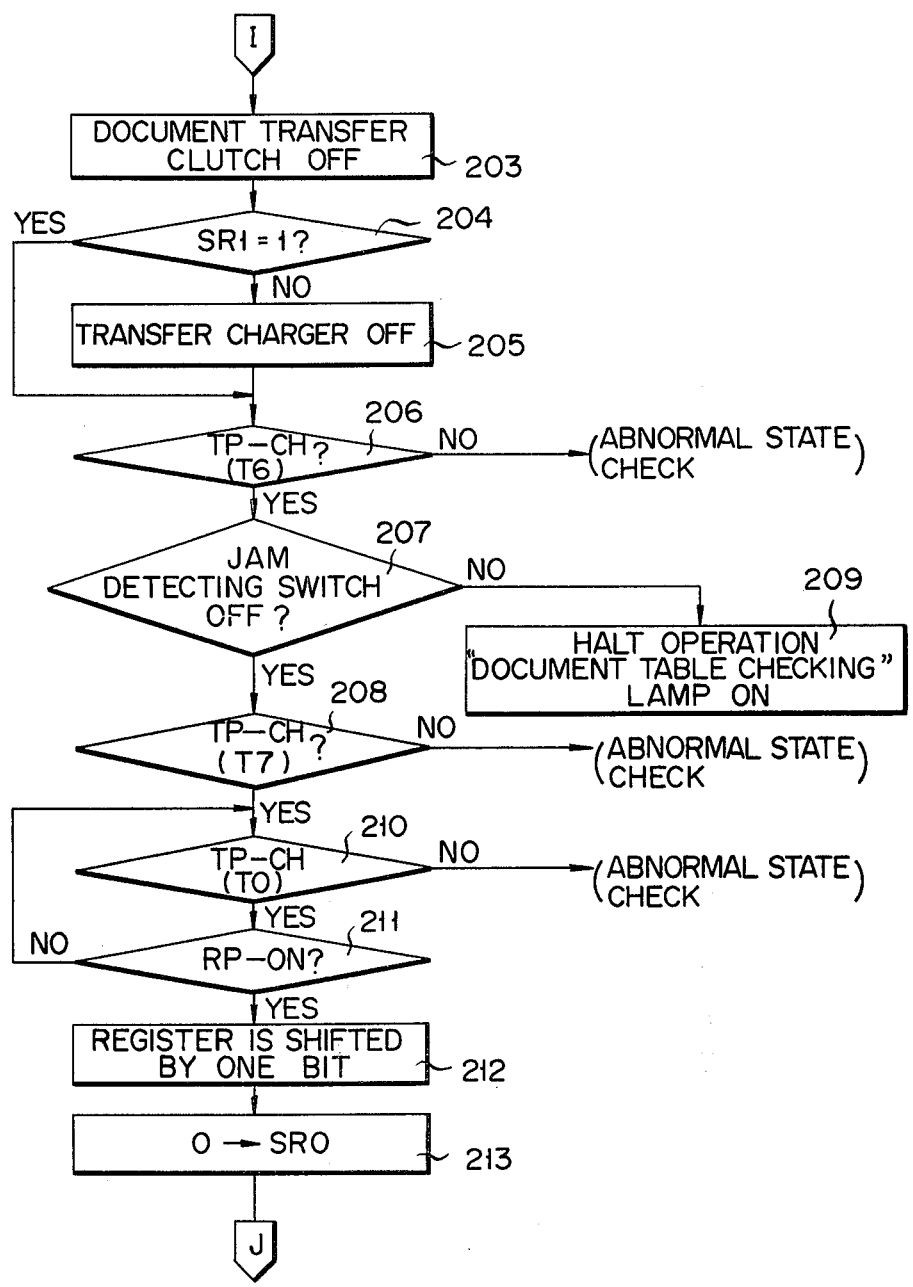
Figure 91:
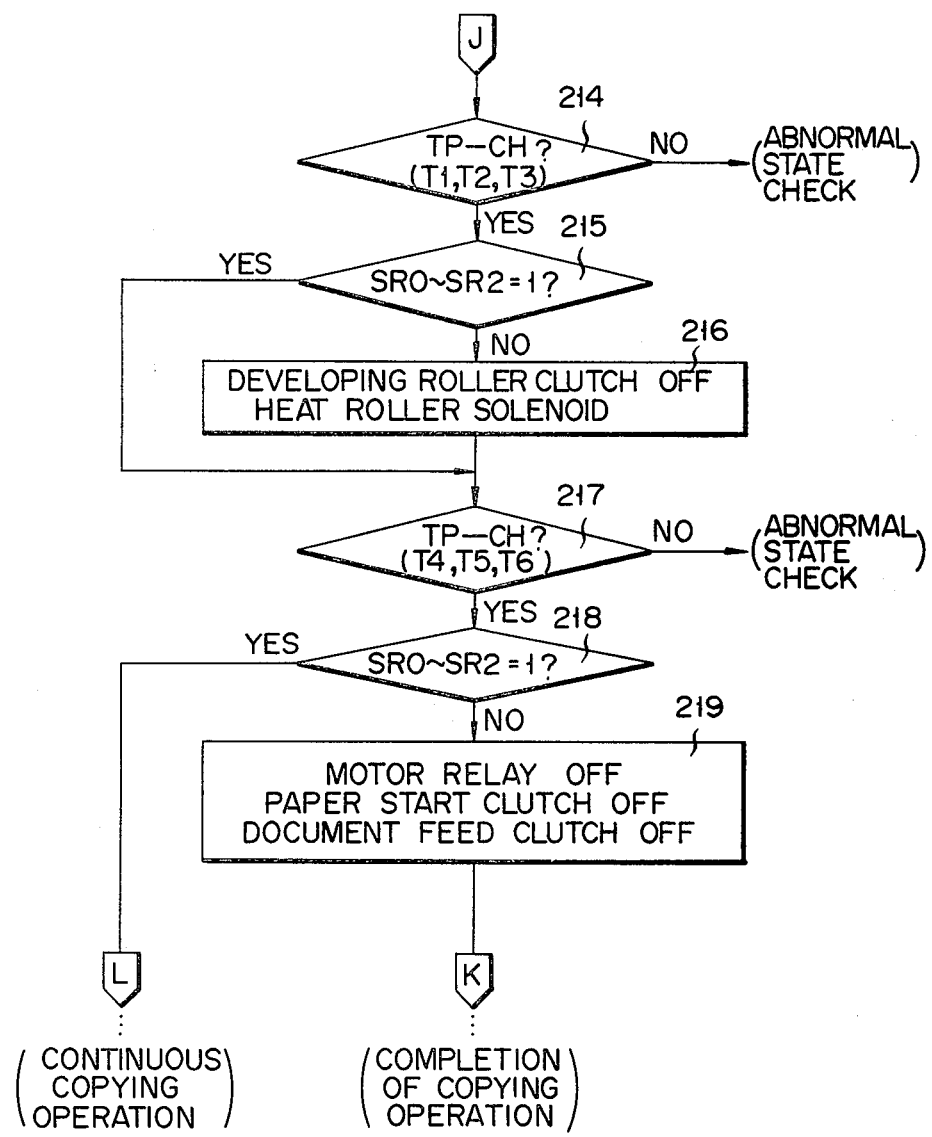
Figure 11A:
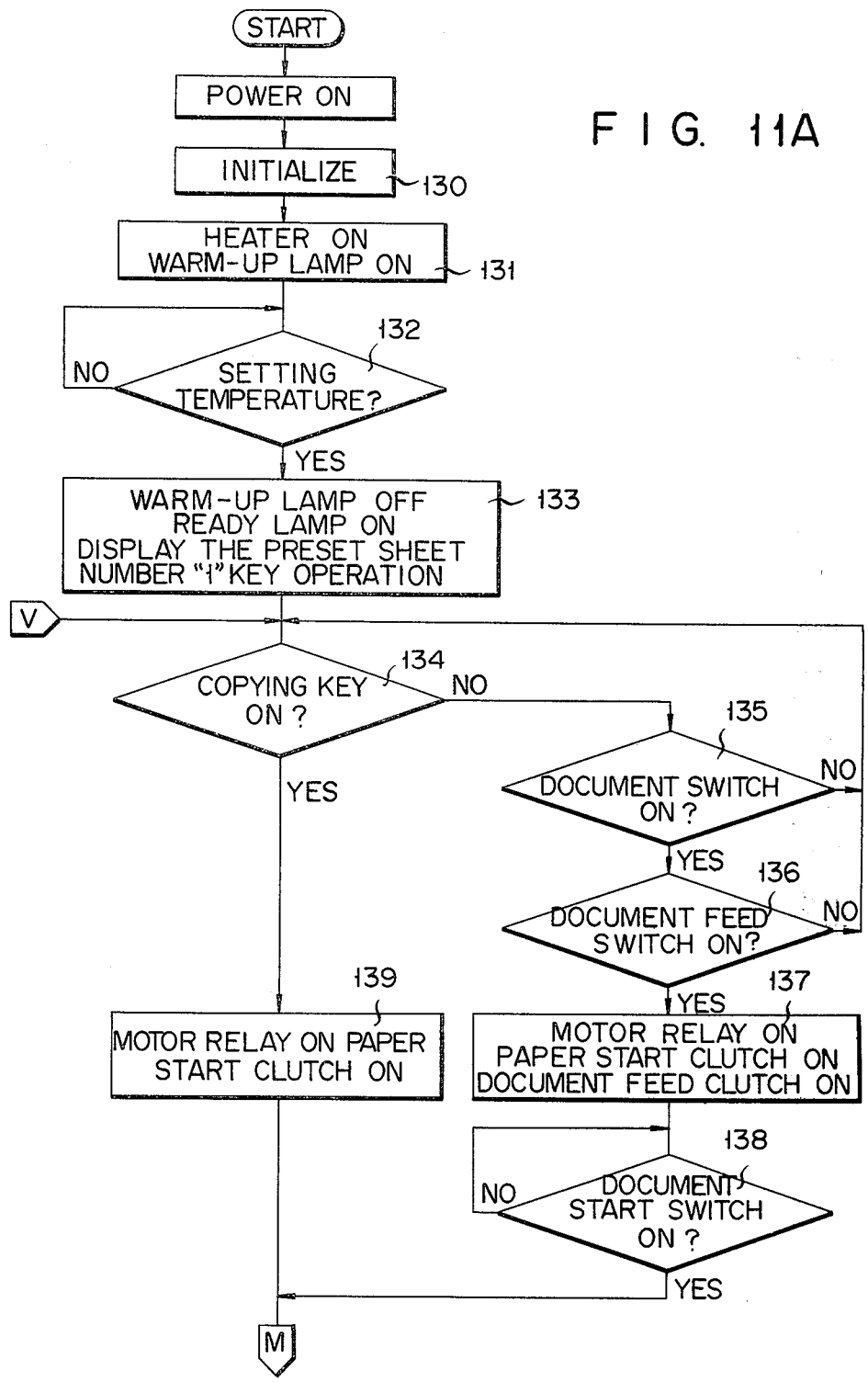
FIGS. 11A through 11F are flow charts showing the sequence control for the continuous copying with the copying machine with an automatic document feeder according to the present invention.
Figure 11B:
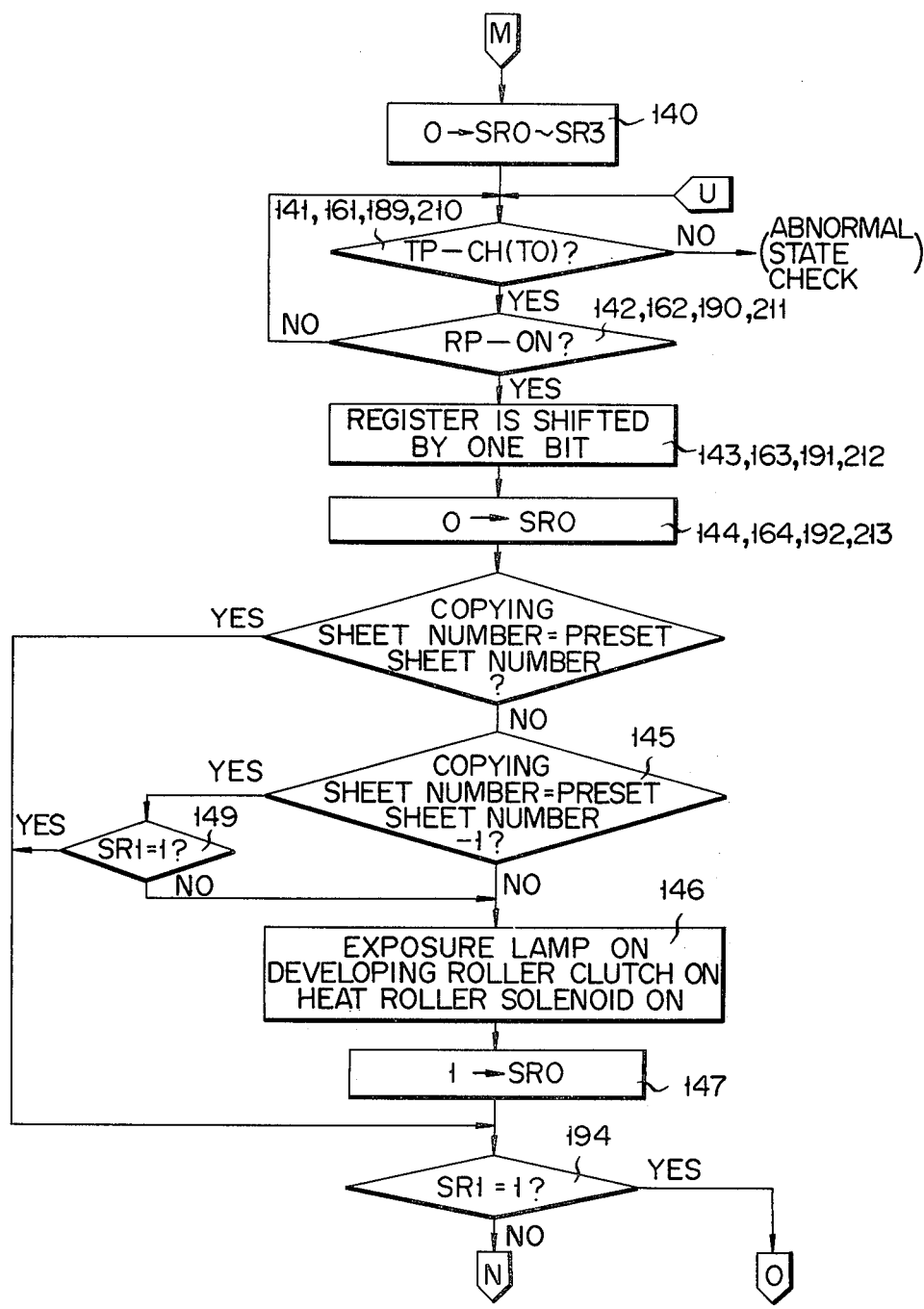
Figure 11C:
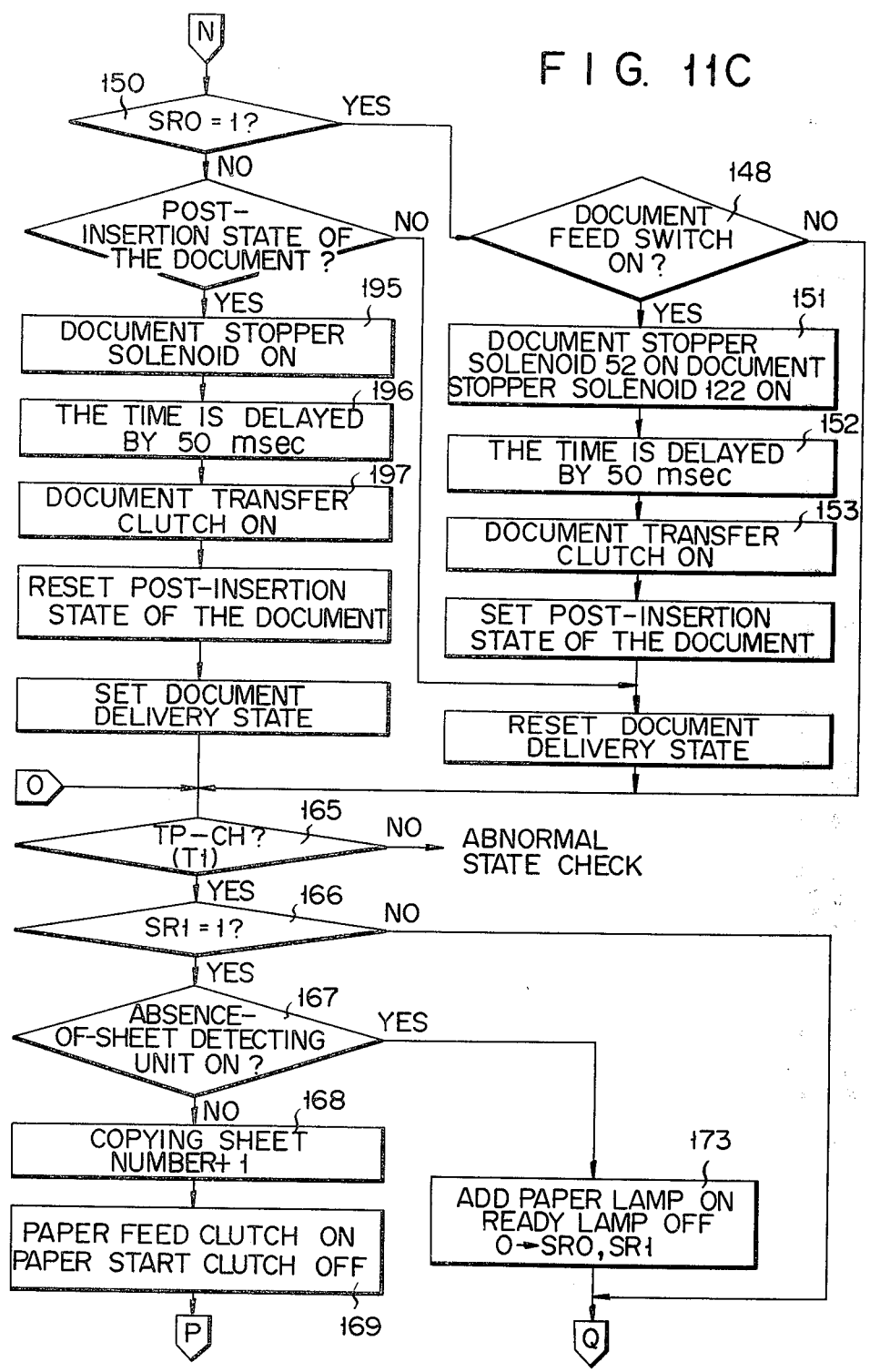
Figure 11D:
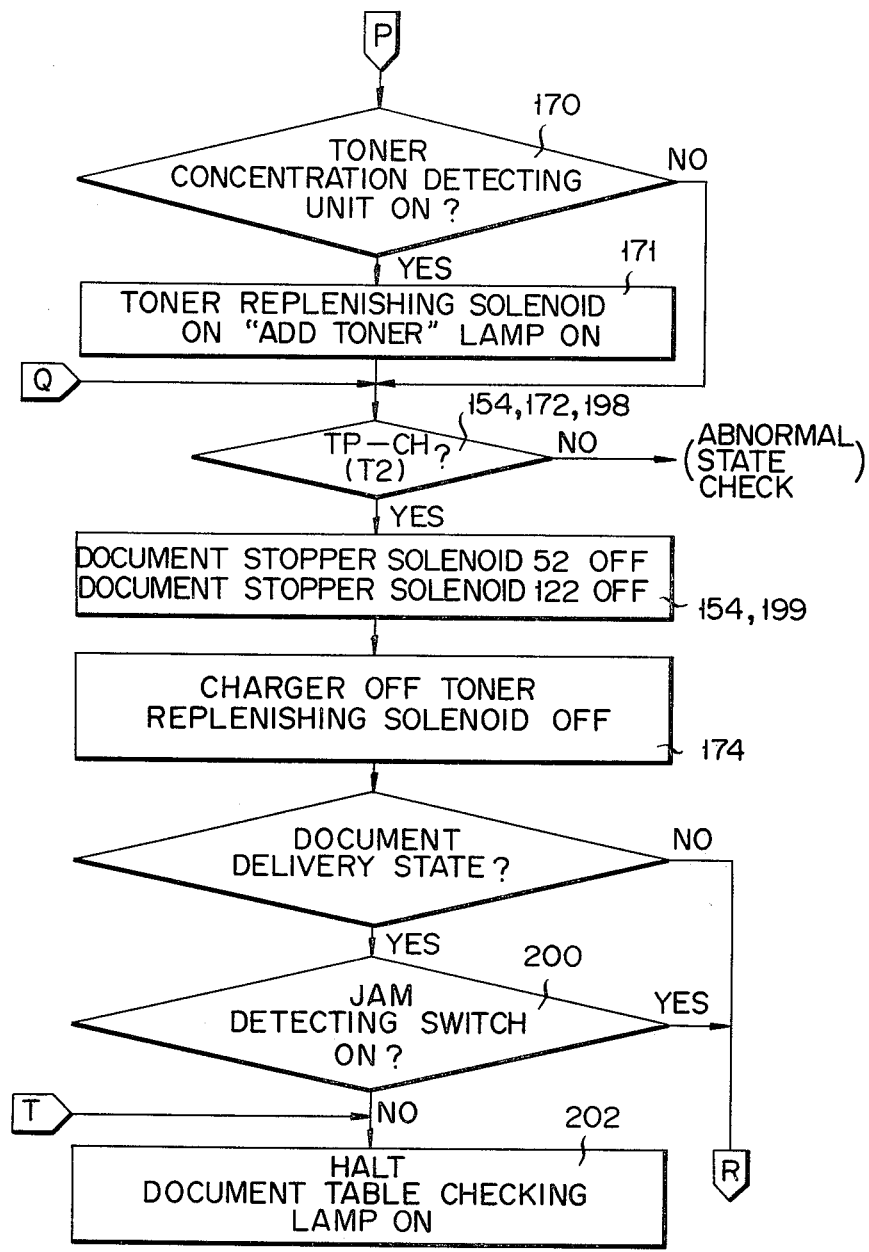
Figure 11E:
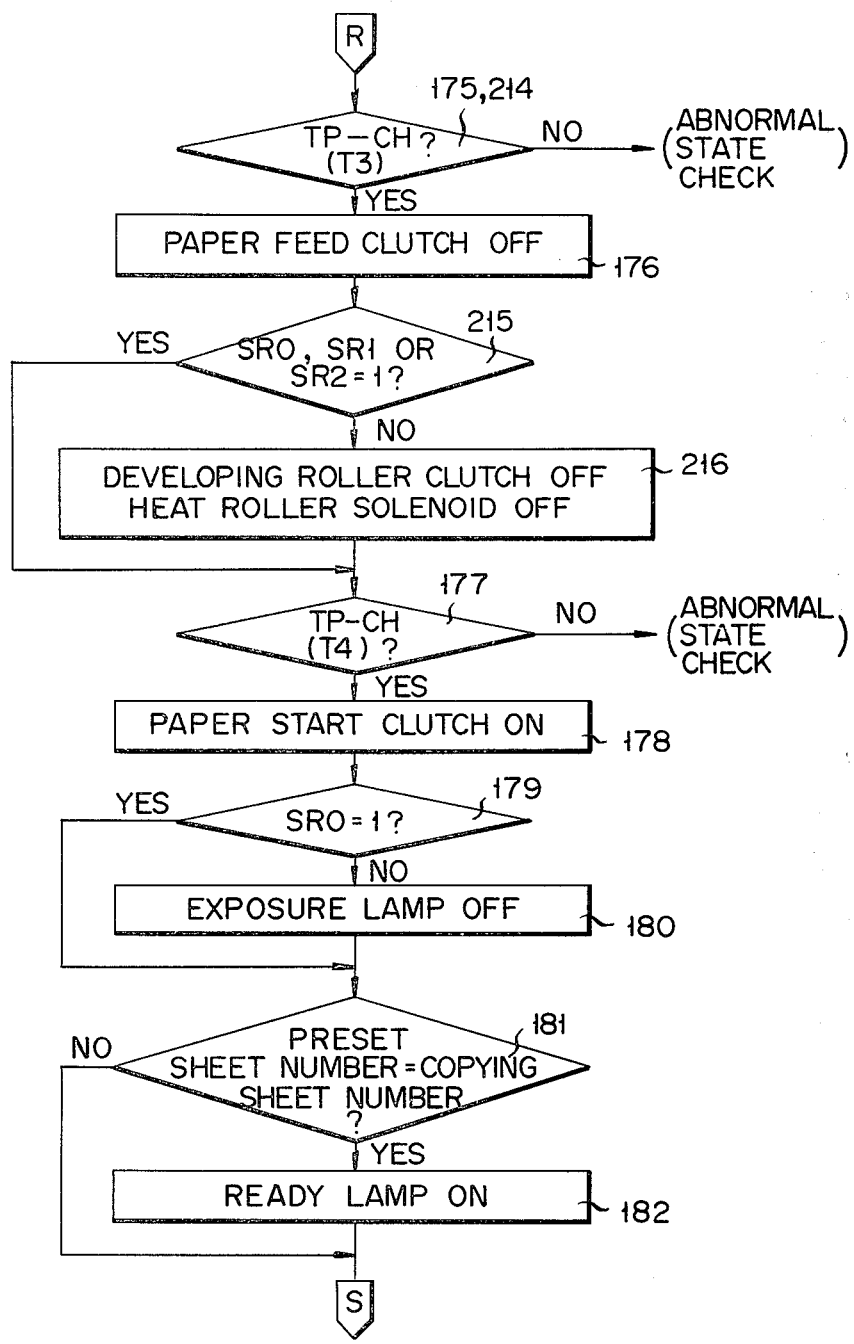
Figure 11F:
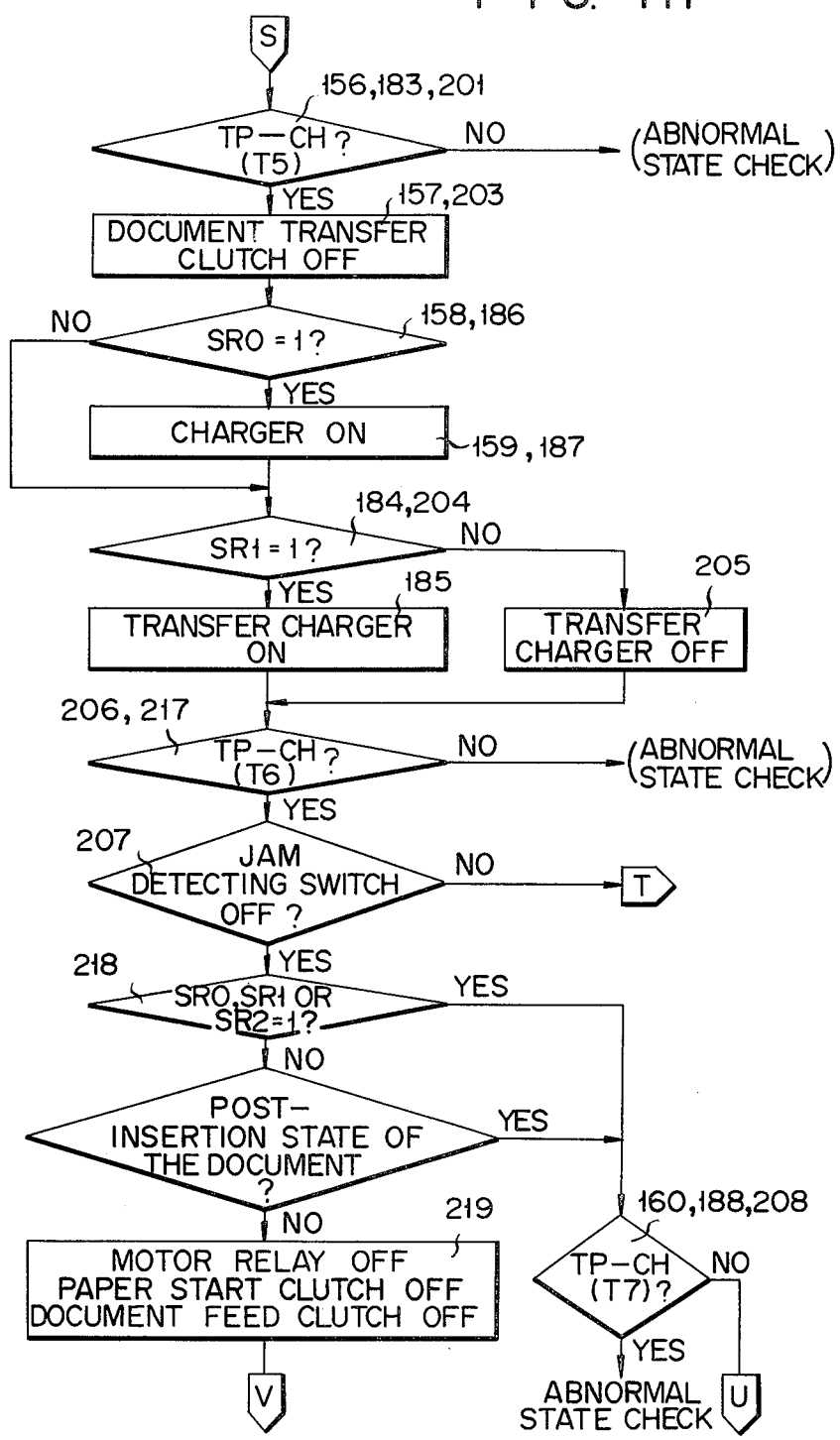

FIGS. 5A and 5B schematically show the control system. A microprocessor 100 comprises a central processing unit 101 (to be referred to as a CPU for brevity hereinafter for overall control); a read-only memory 102 (to be referred to as a ROM for brevity hereinafter) for storing operation sequence programs for the respective copying processing sections for feeding the document, feeding and conveying the copy sheets, charging, exposing, developing and fixing; a random access memory 103 (to be referred to as a RAM for brevity hereinafter); and an input/output control 104 (to be referred to as an IOC for brevity hereinafter) for controlling input and output of signals or data. An input interface circuit 105 for selection of the input is connected to the microprocessor 100. To this input interface circuit 105 are connected the document feed switch 74, the document start switch 75, the jam detecting switch 76, the detectors 87 and 88, the copying key 90, the numeric keys 91, the clear/stop key 92, the interrupt key 95, the density setting key 96 and so on. To the input interface circuit 105 are also connected a document switch 106 which is turned on when the automatic document feeder 3 is closed; a copy sheet detecting means for detecting if the copy sheets 13 in the feed cassette 14 are below a set level, such as an absence-of-sheet detecting unit 107 for detecting the absence of the copy sheet 13; a delivery detecting unit 108 for detecting if the copy sheet 13 is discharged to the discharge tray 25; a lamp position detecting switch 109 for detecting the position of the exposure lamp 5; a fixing temperature detecting unit 110 for detecting the temperature of the heat rollers 23; a toner concentration detector 111 for detecting the toner concentration in the developing unit 12 and so on. In response to a selection signal of 8421 code supplied from the microprocessor 100, the input interface circuit 105 selects inputs from the respective switches and keys for each predetermined group and converts the selected input to a binary code consisting of "0" and "1". These binary codes are input to the microprocessor 100.

An output interface circuit 112 for driving the external equipment is connected to the microprocessor 100. To this output interface circuit 112 are connected the exposure lamp 5, the charger 11, the transfer charger 18 and so on. To this output interface circuit 112 are also connected the charge removal lamp 10, the separation charger 20, the motor relay 113 for controlling the on/off operation of the charge removal charger 26 and the motor 28, a heater relay 114 for controlling the heater of the heat rollers 23; a development roller clutch 115 for controlling the developing rollers of the developing unit 12; a toner replenishing solenoid 116 for controlling the replenishment of the toner; a paper feed clutch for controlling the feed roller 15; a paper start clutch 118 for controlling the aligning rollers 17; a heat roller solenoid 119 for controlling the pressure roller section of the heat rollers 23. In response to the various control signals output from the microprocessor 100, the output interface circuit 112 drives and controls the external equipment.

A latch circuit 120 is connected to the microprocessor 100. To this latch circuit 120 are connected, through the output interface circuit 121 for driving the external equipment, the document stopper solenoid 52, the document feed clutch 69, the document convey clutch 69, and the document stopper solenoid 122 for controlling the document stopper 40.

A shift register 123 for display is connected to the microprocessor 100. To this shift register 123 are also connected, through an output interface circuit 124 for display, the preset sheet number display 93 and the copying sheet number display 94 as well as, through an output interface circuit 125 for display, the interruption display lamp 95a and the state display 98.

Exchange of signals or data at the microprocessor 100 will now be described. The CPU 101 sequentially reads out the programs stored in the ROM 102 and executes the predetermined sequence control. The CPU 101 also performs the input/output control. During this period, the CPU 101 exchanges required data or various control signals with the respective copying processing sections through the IOC 104 and the interface circuits 105 and 112. According to the program read out from the ROM 102, the CPU 101 reads in the state signal or data from the respective processing sections and the control panel which are input from the input interface circuit 105 through the IOC 104. The CPU 101 discriminates the received signals. According to the discrimination results, the CPU 101 outputs the various control signals or data to the interface circuit 112, the shift register 123 and the latch circuit 120 through the IOC 104. The CPU 101 also serves to perform various data processing and to store the data obtained by this processing in the RAM 103. The CPU 101 also reads out the data stored in the RAM 103 as needed.

The mode of operation of the copying machine with an automatic document feeder of the construction as described above will now be described. The control method using the timing disk 78 which is the characteristic feature of the present invention will be briefly described. According to the present invention, the operation necessary for copying is controlled wih reference to the position of the optical system, that is, the position of the timing disk 78 which is connected to the photosensitive drum 9. When the photosensitive drum 9 rotates, the timing disk 78 also rotates. In this embodiment, the photosensitive drum 9 and the timing disk also rotate twice for copying one copy sheet. Since the timing disk 78 has the shape as described above, every time the disk 78 rotates a half revolution, the detector 87 generates the timing signal RP (to be referred to as a reset pulse hereinafter) which is shown in FIG. 6A, and the detector 88 generates a timing signal TP as shown in FIG. 6B. The microprocessor 100 reads in the reset pulse RP and the timing signal TP, and executes the various copying processing at the timings of the timing pulses TP taking the reset pulses RP as a reference. More specifically, as shown in FIGS. 6B through 6F, the microprocessor 100 sequentially discriminates the transition points T0 to T7 (leading edges and trailing edges) of the timing signals TP with reference to the reset pulses RP. Every time it detects the reset pulse RP, the microprocessor 100 executes one cycle at the timing of the transition points T0 to T7 of the timing signal TP. In this embodiment, the microprocessor 100 executes four cycles for copying one copy sheet. If half the revolution of the timing disk 78 is, for example, defined as the 0th cycle, the completion of one revolution is defined as the end of the first cycle, the completion of one and one-half revolutions is defined as the end of the second cycle, and the completion of two revolutions is defined as the end of the third cycle. Processing 1 is executed in the zeroth cycle, processing 2 is executed in the first cycle, processing 3 is executed in the second cycle, and processing 4 is executed in the third cycle. A shift register of bits corresponding to the number of cycles necessary for the process is arranged to judge which cycle is performed from the beginning. In this embodiment, since the number of cycles is four, a shift register SR of 4 bits (SR0 to SR3) is arranged in a predetermined area of the RAM 103 in FIG. 5A. Every time the cycle is initiated, the first bit SR0 is set and the contents of the register SR are shifted for each cycle. The zeroth cycle corresponds to the zeroth bit SR0 and the first cycle corresponds to the first bit SR1. In this manner, the cycle sequentially corresponds to predetermined bits. When the 0th bit is set (SRO=1), processing 1 for the 0th cycle is performed; when the 1st bit is set (SR=1), processing 2 for the 1st cycle is performed. Sequentially, the same operations as in the 0th and 1st cycles are performed. FIGS. 7 and 8 respectively show the correspondence between each cycle and the corresponding register SR for single copying and (continuous) twice copying.

FIGS. 11A through 11F are flow charts for explaining the sequence control for continuous copying by the copying machine with the automatic document feeder according to the present invention. Referring to FIGS. 11A to 11F, steps 141 to 160 correspond to one cycle. Therefore, as described above, in single copying, one cycle which corresponds to step 141 to 160 is performed four times in correspondence with the contents of the shift register SR in the transition points T0 to T7 as shown in FIG. 6B. For example, in a given cycle, when bits SR1 and SR2 of the shift register SR are set at "1", the processing of the first cycle for the Nth sheet corresponding to SR1=1 and the processing of the second cycle for the (N−1)th sheet corresponding to SR2=1 are performed.

For simplifying the description, flow charts for explaining the sequence of operations in four cycles are shown in FIGS. 9A to 9I. Among all the operations shown in FIGS. 11A to 11F, steps which are not directly related to the operation of each cycle in FIGS. 9A to 9I are omitted.

The sequence control of the copying operation according to the present invention will be described in detail with reference to the flow charts shown in FIGS. 9A to 9I. When the power switch (not shown) is turned on, the CPU 101 initializes in step 130. The program then advances to step 131. In step 131, a heater relay 114 is turned on and power is supplied to the heater of the heat rollers 23 so that the heat rollers are heated. The program then advances to step 132. In this state, a warming up lamp 98₁ of the state display unit 98 is lit. In step 132, it is checked if the temperature of the heat rollers 23 has reached a predetermined temperature. If the temperature of the heat rollers 23 has reached the predetermined temperature, the heater relay 114 is turned off. The program then advances to step 133. The heater relay 114 repeats the on/off operation after the temperature of the heat rollers 23 has reached the predetermined temperature to hold constant the temperature of the heat rollers 23. In step 133, the warming up lamp 98₁ goes off, while a ready lamp 98₂ of the state display unit 98 goes on. At the same time, "1" is displayed at the preset sheet number display unit 93 and each key on the control panel is ready to operate. In step 133, when "1" is displayed at the preset sheet number display unit 93, or when the numeric keys 91 are depressed, the program advances to step 134 and it is checked if the copying key 90 is turned on. In this state, when the copying key 90 is not depressed, the program advances to step 135. It is checked if the document switch 106 is turned on. If the document switch 106 is not turned on, the program returns to step 133. If the document switch 106 is turned on, the program goes to step 136. In step 136, it is checked if the document feed switch 74 is turned on. In this case, since the document feed switch 74 is not turned on, the program returns to step 133. In this manner, in the waiting state, steps 133 to 136 are repeated in a waiting operation.

In the waiting state, the copying sheet number is set with the numeric key 91 and the density is set with the density setting key 96. Alternatively, instead of performing the above settings, the automatic document feeder 3 is closed and the document 41 is inserted through the paper guide 42. The document switch 106 and the document feed switch 74 are then turned on so that the program advances from step 136 to step 137. In step 137, the motor relay 113, the paper start clutch 118 and the document feed clutch 69 are turned on and the program advances to step 138. When the motor relay 113 is turned on, the charge removal lamp 10, the separation charger 20, the charge removal charger 26 and the motor 28 respectively operate. When the motor 28 starts rotating, rotation of the photosensitive drum 9, reciprocal movement of the exposure lamp 5 and the lens 6, and rotation of the heat roller 23 and the discharge rollers 24 are initiated. When the paper start clutch 118 is turned on, the aligning rollers 17 start operating. When the document feed clutch 69 starts operating, the inclined rollers 53 start rotating. When the inclined rollers 53 operate, the document 41 whose leading edges are aligned is conveyed to the stop lever 50. The document 41 is then stopped at this position temporarily. At this moment, the document start switch 75 is turned on. In step 138, it is checked if the document start switch 75 is turned on. If it is turned on, the copying operation to be described below is performed. In the waiting state, if the copying key 90 is depressed, the program advances from step 134 to step 139. In step 139, the motor relay 113 and the paper start clutch 118 are turned on, and the copying operation to be described below will be performed. In this state, the automatic document feeder 3 is not used so that the document feed clutch 69 is not turned on.

However, if the copying operation is initiated by depressing the document start switch 75, the program advances from step 138 to step 140. In step 140, the register SR is cleared and the program advances to step 141. In step 141, the timing signal TP is checked (TP-CH) to detect the transition point T0. If the transition point T0 is detected, the program advances to step 142. In this case, if the transition point T0 is not detected, an abnormal state check routine is initiated and the mechanical operation is stopped. If the transition point is not detected in checking (TP-CH) of the timing signal TP in the following description, the same operation is repeated so that the description thereof will be omitted. In step 142, the reset pulse RP is detected (RP-ON). If the reset pulse RP is not detected, the program returns to step 141. Steps 141 and 142 are repeated. When the reset pulse RP is detected, the program advances to step 143. In step 143, the register SR is shifted by one bit and the program advances to step 144. In step 144, "0" is set in the 0th bit SR0 of the register SR. The program then advances to step 145. In step 145, it is checked if "copying sheet number is equal to preset sheet number minus one." If the preset sheet number is not equal to the copying sheet number and one additional sheet, the program advances to step 146. In step 146, the exposure lamp 5, the developing roller clutch 115 and the heat roller solenoid 119 are turned on, and the program then advances to step 147. When the developing magnet rollers of the developing unit 12 start rotating and the heat roller solenoid 119 is turned on, the heat rollers 23 turn from the pressure roller sections to the heating roller sections. In step 147, "1" is set in the 0 bit SR0 of the register SR, and the program advances to step 148. In step 145 described above, if the copying sheet number equals the preset sheet number and one additional sheet, the program advances to step 149. In step 149, it is checked if the first bit SR1 of the register SR is "1". If the first bit SR1 is not set at "1", the program goes to step 146. However, if the first bit SR1 is set at "1", the program makes a jump to step 148 skipping steps 146 and 147.

In step 148, it is checked if the document feed switch 74 is on. If the switch is turned on, the program advances to step 150. In step 150, it is checked if the 0th bit SR0 is set at "1". If the 0th bit SR0 is set at "1", the program advances to step 151. In step 151, the document stopper solenoids 52 and 122 are turned on, and the program advances to step 152. When the document stopper solenoid 52 is turned on, the document 41 is released from the stopped state by the stop lever 50 and the released document is fed by the stop lever 50 to a space between the document table 2 and the convey belt 38 by the inclined rollers 53. In step 152, a time delay of, for example, 50 msec, is introduced and the program advances to step 153. In step 153, the document convey clutch 61 starts operating and the program advances to step 154. When the document convey clutch 61 is operated, the convey belt 38 starts moving. In this manner, the document 41 is fed to the document table 2. In this case, if a previous document remains on the table, the document stopper 40 is pulled down in response to the on state of the document stopper solenoid 122 so that the document is discharged to the document stocker 77. In step 148 described above, if the document feed switch 74 is not on, the program jumps to step 154 skipping steps 150 to 153 because this copying operation is not performed with the automatic document feeder. In step 150, unless the 0th bit SR0 of the register SR is set at "1", the microprocessor judges that the document 41 must not be fed, and the program jumps to step 154 skipping steps 151 to 153.

In step 154, the transition points T1 and T2 of the timing signal TP are sequentially detected. When the transition point T2 is detected, the program advances to step 155. In step 155, the document stopper solenoids 52 and 122 are turned off and the program advances to step 156. In this condition, a next document 41 may be inserted. If the next document 41 is inserted, it is temporarily stopped by the stop lever 50. The document is set in the waiting state. In step 156, the transition points T3, T4 and T5 of the timing signal TP are sequentially detected. When the transition point T5 is detected, the program advances to step 157. In step 157, the document convey clutch 61 is turned off and the program advances to step 158. When the document convey clutch 61 is turned off, the convey belt 38 stops moving. Therefore, the document 41 stops at the predetermined position on the document table 2. In this state, the optical system is ready for exposure. In step 158, it is checked if the 0th bit SR0 of the register SR is set at "1". If the 0th bit is set at "1", the program advances to step 159. In step 159, the charger 11 is turned on and the program advances to step 160. When the charger 11 is turned on, the surface of the photosensitive drum 9 is started to be charged and the exposure by the optical system is initiated. In step 158, if the 0th bit SR0 is not set at "1", the microprocessor judges that the charger 11 must not be turned on, and the program jumps to step 160 skipping step 159. In step 160, the transition points T6 and T7 of the timing signal TP are sequentially detected by checking the timing signal TP. When the transition point T7 is detected, the program advances to step 161. In step 161, the transition point T0 of the timing signal TP is detected. When the transition point T0 is detected, the program advances to step 162. In step 162, the reset pulse RP is detected. If the pulse is not detected, the program returns to step 161 and repeats steps 161 and 162. When the reset pulse RP is detected, the program advances to step 163. In step 163, the resister SR is shifted by one bit and the program advances to step 164. In this state, the first bit SR1 of the register SR is set at "1" since the register SR is shifted by one bit. In step 164, the 0th bit SR0 of the register SR is set at "0" and the program advances to step 165.

In step 165, the transition point T1 of the timing signal TP is detected and the program advances to step 166. In step 166, it is checked if the first bit SR1 of the register SR is set at "1". If the first bit is set at "1", the program advances to step 167. In step 167, it is checked if the absence-of-sheet detecting unit 107 is turned on. If the absence-of-sheet detecting unit 107 is not turned on, the program advances to step 168. In step 168, "+1" is added to the contents of the copying sheet number display 94 and the program advances to step 169. In step 169, the paper feed clutch 117 is turned on while the paper start clutch 118 is turned off. The program then advances to step 170. When the paper feed clutch 117 is turned on, the paper roller 15 stars rotating so that the copy sheet is fed. When the paper start clutch 118 is turned off, the aligning rollers stop rotating. In step 170, it is checked if the toner concentration detector 111 is turned on. If the toner concentration detector 111 is turned on, the program advances to step 171. In step 171, the toner replenishing solenoid 116 is turned on and at the same time the toner replenishing lamp 98$_3$ of the state display unit 98 goes on. The program then advances to step 172. When the toner replenishing solenoid 116 is turned on, a predetermined amount of toner is replenished to the developing unit 12. In step 170, if the toner concentration detector 111 is not turned on, toner replenishing operation is not required so that the program jumps to step 172 skipping step 171. In step 166, when the first bit SR1 of the register SR is not set at "1", the microprocessor judges that the sheet must not be fed. The program, therefore, jumps to step 172 skipping steps 167 to 171. In step 167, when the absence-of-sheet detecting unit 107 is turned on, sheets are not present in the feed cassette 14 and sheet feeding cannot be performed. The program, therefore, advances to step 173. In step 173, the ready lamp 98$_2$ of the state display unit 98 goes off, while an add paper lamp 98$_4$ goes on. When the 0th bit SR0 and the first bit SR1 of the register SR are set at "0", the program advances to step 172. In step 172, the transition point T2 of the timing signal TP is detected, and the program advances to step 174. In step 174, the charger 11 and the toner replenishing solenoid 116 are turned off and the program advances to step 175.

In step 175, the transition point T3 of the timing signal TP is detected, and the program advances to step 176. In step 176, the paper feed clutch 117 is turned off and the program advances to step 177. When the paper feed clutch 117 is turned off, the fed sheet 13 is temporarily stopped in the vicinity of the aligning rollers 17. In step 177, the transition point T4 of the timing signal TP is detected and the program advances to step 178. In step 178, the paper start clutch 118 is turned on, and the aligning rollers 17 start rotating. The sheet temporarily stopped in the vicinity of the aligning rollers 17 is then conveyed and fed to the transfer section. The leading edge of the image on the photosensitive drum 9 is made to coincide with the leading edge of the sheet 13. In step 179, it is checked if the 0th bit SR0 of the register SR is set at "1". If the 0th bit SR0 is not set at "1", the program advances to step 180. In step 180, the exposure lamp 5 is turned off, and the program advances to step 181. In step 179, when the 0th bit SR0 of the register SR is set at "1", the microprocessor judges that the exposure lamp 5 must not be turned off, and the program skips step 180 and jumps to step 181. In step 181, it is checked if the copying sheet number coincides with the present sheet number. If they coincide, the program advances to step 182. In step 182, the ready lamp 98$_2$ goes on, and the program advances to step 183. In this state, a next document 41 is ready to be fed. If the copying sheet number does not coincide with the preset sheet number in step 181, the copying operation must still be continued so that the program skips step 182 and jumps to step 183.

In step 183, the transition point T5 of the timing signal TP is detected and the program advances to step 184. In step 184, it is checked if the first bit SR1 of the register SR is set at "1". If the first bit SR1 is set at "1", the program advances to step 185. In step 185, the transfer charger 18 is turned on and the program advances to step 186. When the transfer charger 18 is turned on, the toner image on the photosensitive drum 9 is transferred onto the sheet 13. In step 184, if the first bit SR1 of the register SR is not set at "1", the microprocessor judges that the transfer must not be performed. The program then skips step 185 and jumps to step 186. In step 186, it is checked if the 0th bit of the register SR is set at "1". If the 0th bit of the register SR is set at "1", the program advances to step 187. In step 187, the charger 11 is turned on and the program advances to step 188. In step 187, the charging operation for a next document in the continuous copying is performed. In step 186, unless the 0th bit SR0 of the register SR is set at "1", the microprocessor judges that charging must not be performed. The program skips step 187 and jumps to step 188. In step 188, the transition points T6 and T7 of the timing signal TP are sequentially detected. When the transition point T7 is detected, the program advances to step 189. In step 189, the transition point T0 of the timing signal TP is detected and the program advances to step 190. In step 190, the reset pulse RP is detected. If the reset pulse RP is not detected, the program returns to step 189 and repeats steps 189 and 190. When the reset pulse RP is detected, the program then advances to step 191. In this state, the register SR is shifted by one bit again and the program advances to step 192. In this condition, the second bit SR2 of the register SR is set at "1" because the register SR is shifted by one bit. In step 192, the 0th bit SR0 of the register SR is set at "0" and the program advances to step 194. In step 194, it is checked if the first bit SR1 of the register SR is set at "1". If the first bit SR1 is not set at "1", the program advances to step 195. In step 195, the document stopper solenoid 122 is turned on and the program advances to step 196. When the document stopper solenoid 122 is turned on, the document stopper 40 is pulled down. In step 196, the time delay of, for example, 50 msec is introduced and the program advances to step 197. In step 197, the document convey clutch 61 is turned on again and the convey belt 38 then starts moving. Therefore, the document 41 discharged after copying to the document stocker 77. If the first bit SR1 of the register SR is set at "1" in step 194, the microprocessor judges that discharging of the document 41 must not be performed. The program then skips steps 195 to 197 and jumps to step 198. In step 198, the transition points T1 and T2 of the timing signal TP are sequentially detected. When the transition point T2 is detected, the program advances to step 199. In step 199, the document stopper solenoid 122 is turned off and the program advances to step 200. In step 200, it is checked if the discharged document 41 reaches the jam detection switch 76 within a predetermined tolerance, that is, the jam detection switch 76 is turned on. If the jam detection switch 76 is turned on, the program advances to step 201. However, if the jam detection switch 76 is not turned on, the microprocessor judges that jamming of the document 41 has occured on the document table 2 or at the discharging section, and the program advances to step 202. In this step, the mechanical operation stops and a document table check lamp 98₅ of the state display unit 98 goes on.

In step 201, the transition points T3 and T4 of the timing signal TP are sequentially detected. When the transition point T4 is detected, the program advances to step 203. In step 203, the document convey clutch 61 is turned off and the program advances to step 204. In this state, the document 41 discharged from the document table 2 is in the document stocker 77. In step 204, it is checked if the first bit SR1 of the register SR is set at "1". If the first bit SR1 is not set at "1", the program advances to step 205. In step 205, the transfer charger 18 is turned off, and the program advances to step 206. In step 204, when the first bit SR1 of the register SR is set at "1", the microprocessor judges that the transfer charger 18 must not be turned off. The program then jumps to step 206 skipping step 205. In step 206, the transition point T6 of the timing signal TP is detected and the program advances to step 207. In step 207, the jam detection switch 76 is set in the operative mode. It is checked if the document discharged from the document table 2 passes through the jam detection switch 76 within a predetermined tolerance, that is, the jam detection switch 76 is in the off state. If the jam detection switch 76 is turned off, the program advances to step 208. However, if the jam detection switch 76 is not in the off state, it is judged that jamming of the document has occured on the document table 2 or at the discharging section. The program, therefore, advances to step 209. The mechanical operation is stopped and the document table check lamp 98₅ goes on.

In step 208, the transition point T7 of the timing signal TP is detected and the program advances to step 210. In step 210, the transition point T0 of the timing signal TP is detected and the program advances to step 211. In step 211, the reset pulse RP is detected. If the reset pulse RP is not detected, the program returns to step 210 and repeats 201 and 211. When the reset pulse RP is detected, the program advances to step 212. In this step, the resister SR is shifted by one bit again, and the program advances to step 213. In this state, the third bit SR3 of the register SR is set at "1" because the register SR is shifted by one bit. In step 213, the 0th bit SR0 of the register SR is set at "0" and the program advances to step 214. In step 214, the transition points of T1, T2 and T3 of the timing signal TP are sequentially detected. When the transition point T3 is detected, the program advances to step 215. In step 215, it is checked if the bits SR0 to SR2 of the register SR are set at "1". If all the bits SR0 to SR2 are not set at "1", the program advances to step 216. In step 216, the development roller clutch 115 and the heat roller solenoid 119 are turned off and the program advances to step 217. If any bit is at "1" in step 215, the microprocessor judges that the development roller clutch 115 and the solenoid 119 must not be turned off. The program, therefore, skips step 216 and jumps to step 217. In step 217, the transition points T4, T5 and T6 of the timing signal TP are sequentially detected. When the transition point T6 is detected, the program advances to step 218. In step 218, it is checked if the bits SR0 to SR2 of the register SR are set at "1". If the bits SR0 to SR2 are not all set at "1", the microprocessor judges that the copying operation is completed. The program then advances to step 219. In step 219, the motor relay 113, the paper start clutch 118 and the document feed clutch 69 are turned off. The program returns to step 133 and is held in the waiting state. When the motor relay 113 and the respective clutches 118 and 69 are turned off, the copying machine completes a series of copying operations and is held in the waiting state. If one of the bits is set at "1" in step 218, the microprocessor judges that the continuous copying operation is not completed. The program, therefore, returns to step 141 and repeats the subsequent steps.

In this manner, when single copying is performed, the respective components operate for a period in which the optical system repeats reciprocal movement four times (that is, the timing disk 78 revolves two times). On the other hand, when continuous copying is performed, the same operation as in single copying is delayed by one cycle and is repeated to the end of the copying operation. The flow chart of the main components in the copying operation is shown in FIG. 10.

The operation of feeding a sheet, that is, the characteristic feature of the present invention, will be described in detail. When each step is executed as described above, that is, when continuous copying is performed with the automatic document feeder 3, no more copy sheet, for example, is in the feed cassette 14 and the absence-of-sheet detecting unit 107 is turned on. This state is thus detected by the absence-of-sheet detecting unit 107 as described in step 167. The add paper lamp 98$_4$ goes on in step 173, while the ready lamp 98$_2$ goes off. Furthermore, the bits SR0 and SR1 of the register SR are set at "0". At this state, the document stopper solenoid 122 is turned on and the document convey clutch 61 is then turned on so that the document 41 on the document table 2 is forced to be discharged. Actually, beginning from step 167 and then steps 173, 172, 174 to 194 are sequentially performed. The document 41 is forcibly discharged in steps 195 to 197. Therefore, when the sheet is ready to be fed, the document 41 does not remain in the automatic document feeder 3. In this case, after the sheet 13 which is fed before the absence-of-sheet detecting unit 107 is turned on is completely discharged, the copying machine stops its operation.

While the present invention has been particularly shown and described with reference to a preferred embodiment thereof, it will be understood by those skilled in the art that various changes in form and details may be made therein without departing from the spirit and scope of the present invention.

What we claim is:

1. A copying machine with an automatic document feeder, comprising:
   (A) a copying machine main body having
   a. a document table on which is set a document,
   b. copy sheet storing means for storing copy sheets,
   c. sheet amount detecting means for detecting if an amount of the copy sheets in said copy sheet storing means has reached a predetermined value,
   d. feeding means for individually feeding the copy sheets from said copy sheet storing means, and
   e. image forming means for forming, on the copy sheet supplied by said copy sheet feeding means, an image of the document set on said document table
   (B) an automatic document feeder having
   a. conveying means for conveying the inserted document to said document table,
   b. discharging means for discharging the document from said document table after image formation,
   c. document feed inhibiting means for inhibiting supply to said document table of a document following the document after image formation, and
   d. a detector which detects insertion of the document to generate a copying start signal to said copying machine main body; and
   (c) controlling means for controlling said discharging means to forcibly discharge said document in response to a detection signal from said sheet amount detecting means.

2. A device according to claim 1, wherein said controlling means includes a programmable microprocessor connected to said sheet amount detecting means, said discharging means and said document feed inhibiting means, and microprocessor including a read-only memory device for storing a permanent program and a central processing unit for receiving an input signal to control said discharging means and said document feed inhibiting means, and said read-only memory device having the permanent program for said central processing unit so that said controlling means performs a specific function according to the program; wherein, when a sheet feed mode is initiated during an operation of said automatic document feeder, said sheet amount detecting means, said discharging means and said document feed inhibiting means are controlled to forcibly discharge the document which is placed on said document table and to prevent feeding of a next document onto said document table.

3. A device according to claim 2, wherein said controlling means has flags corresponding to respective copying steps when a copying operation constituted by a plurality of copying steps is continuously performed, and said copying machine main body and said automatic document feeder are controlled by said controlling means to simultaneously perform the respective copying steps in accordance with the flags.

* * * * *